(12) United States Patent
Rohde

(10) Patent No.: US 10,509,243 B2
(45) Date of Patent: Dec. 17, 2019

(54) BIAS CONTROL OF OPTICAL MODULATORS

(71) Applicant: Elenion Technologies, LLC, New York, NY (US)

(72) Inventor: Bernd-Harald Horst Jurgen Rohde, Munich (DE)

(73) Assignee: Elenion Technologies, LLC, New York, NY (US)

( * ) Notice: Subject to any disclaimer, the term of this patent is extended or adjusted under 35 U.S.C. 154(b) by 22 days.

(21) Appl. No.: 15/810,671

(22) Filed: Nov. 13, 2017

(65) Prior Publication Data

US 2018/0267340 A1 Sep. 20, 2018

Related U.S. Application Data

(63) Continuation-in-part of application No. 15/459,066, filed on Mar. 15, 2017.

(51) Int. Cl.

| G02F 1/01 | (2006.01) |
|---|---|
| G02F 1/225 | (2006.01) |
| H04B 10/556 | (2013.01) |
| H04L 27/20 | (2006.01) |
| H04B 10/079 | (2013.01) |
| H04B 10/50 | (2013.01) |
| G02F 1/21 | (2006.01) |

(52) U.S. Cl.
CPC .......... G02F 1/0123 (2013.01); G02F 1/225 (2013.01); H04B 10/07955 (2013.01); H04B 10/5053 (2013.01); H04B 10/50577 (2013.01); H04B 10/5561 (2013.01); H04L 27/2096 (2013.01); *G02F 2001/212* (2013.01)

(58) Field of Classification Search
CPC ............................. G02F 1/0123; G02F 1/225
See application file for complete search history.

(56) References Cited

U.S. PATENT DOCUMENTS

| 5,835,212 A | 11/1998 | Kissa |
|---|---|---|
| 6,211,996 B1 | 4/2001 | Fuse |

(Continued)

OTHER PUBLICATIONS

Tao Gui, Cai Li, Qi Yang, Xiao Xiao, Linghen Meng, Chao Li, Xingwen Yi, Chao Jin, and Zhaohui Li, "Auto bias control technique for optical OFDM transmitter with bias dithering," Opt. Express 21, 5833-5841 (Year: 2013).*

(Continued)

*Primary Examiner* — Peter Radkowski
(74) *Attorney, Agent, or Firm* — Stratford Managers Corporation

(57) ABSTRACT

An optical IQ modulator with automatic bias control is disclosed. A dither signal is applied to the modulator bias and its signature detected in light tapped from an output of the modulator using a phase sensitive dither detector such as a lock-in amplifier. The detected signal is processed using pre-recorded information defining the direction of the detected signal change relative to a change in the modulator bias, and the bias is adjusted in the direction determined using the information. The IQ phase bias is controlled by dithering I and Q optical signals in quadrature to produce opposite-sign single subband modulation of output light at two different dither frequencies, and detecting an oscillation at a difference frequency using a lock-in detector.

10 Claims, 13 Drawing Sheets

(56) References Cited

U.S. PATENT DOCUMENTS

| | | | |
|---|---|---|---|
| 6,915,082 B2 | 7/2005 | Yano | |
| 7,394,992 B2 * | 7/2008 | Kimmitt | G02F 1/0123 398/185 |
| 7,603,007 B2 | 10/2009 | Terahara | |
| 7,899,338 B2 | 3/2011 | Hashimoto | |
| 7,907,324 B2 | 3/2011 | Hoshida | |
| 8,050,351 B2 | 11/2011 | Cho | |
| 8,401,399 B2 | 3/2013 | Barton | |
| 8,849,129 B2 | 9/2014 | Bhandare | |
| 9,116,368 B2 | 8/2015 | Kawakami | |
| 2003/0175037 A1 * | 9/2003 | Kimmitt | G02F 1/0123 398/198 |
| 2005/0213862 A1 | 9/2005 | Kawanishi | |
| 2005/0220385 A1 | 10/2005 | Kawanishi | |
| 2007/0019968 A1 | 1/2007 | Hashimoto | |
| 2007/0133918 A1 | 6/2007 | Cho | |
| 2007/0212075 A1 | 9/2007 | Yin | |
| 2009/0244685 A1 | 10/2009 | Hoshida | |
| 2013/0121631 A1 | 5/2013 | Yu | |
| 2014/0153077 A1 | 6/2014 | Kawakami | |
| 2016/0036533 A1 | 2/2016 | Nakashima | |
| 2016/0282699 A1 | 9/2016 | Gottwald | |
| 2016/0315699 A1 | 10/2016 | Izumi | |
| 2017/0124860 A1 | 5/2017 | Shih | |

OTHER PUBLICATIONS

Xiaoqi Zhu, Zhennan Zheng, Cheng Zhang, Lixin Zhu, Zhenning Tao, and Zhangyuan Chen, "Coherent Detection-Based Automatic Bias Control of Mach—Zehnder Modulators for Various Modulation Formats," J. Lightwave Technol. 32, 2502-2509 (2014) (Year: 2014).*

Xiaolei Li, Lei Deng, Xiaoman Chen, Mengfan Cheng, Songnian Fu, Ming Tang, and Deming Liu, "Modulation-format-free and automatic bias control for optical IQ modulators based on dither-correlation detection," Opt. Express 25, 9333-9345 (2017).*

Blair et al., Phase sensitive detection as a means to recover signals buried in noise, J. Phys. E: Sci. Instrum. 8 621, 1975.*

Loizos et al., Integrated multi-dithering controller for adaptive optics, Proc. SPIE 6708, Atmospheric Optics: Models, Measurements, and Target-in-the-Loop Propagation, 67080B (Sep. 25, 2007) (Year: 2007).*

Zhuravlev, Pavel, Development of a Stable Laser Lock System, Dissertation, College of William & Mary, 2012. (Year: 2012).*

H. Kawakami, et al.; "Auto Bias Control Technique Based on Asymmetric Bias Dithering for Optical QPSK Modulation"; IEEE J. Lightwave Tech., vol. 30, No. 7, pp. 962-968; Apr. 1, 2012 (7 pages).

Y. Yang, et al.; "A robust and dither-free technique for controlling driver signal amplitude for stable and arbitrary optical phase modulation"; Optics Express, vol. 19, No. 27, pp. 26353-26358; Dec. 19, 2011 (6 pages).

P. S. Cho, et al.; "Closed-Loop Bias Control of Optical Quadrature Modulator"; IEEE Photonics Tech. Ltrs., vol. 18, No. 21, pp. 2209-2211; Nov. 1, 2006 (3 pages).

P. Dong, et al.; "Experimental demonstration of microring quadrature phase-shift keying modulators"; Optics Ltrs., vol. 37, No. 7, pp. 1178-1180; Apr. 1, 2012 (3 pages).

* cited by examiner

BIAS CONTROL OF OPTICAL MODULATORS

CROSS-REFERENCE TO RELATED APPLICATIONS

This application is a continuation in part of U.S. patent application Ser. No. 15/459,066 titled "Bias Control of Optical Modulators" filed on Mar. 15, 2017, which is incorporated herein by reference in its entirety.

FIELD OF THE INVENTION

The invention generally relates to photonic integrated circuits, and more particularly relates to an apparatus and method for an automated bias monitoring and control of an optical modulator wherein two optical signals are coherently combined with a target phase relationship therebetween.

BACKGROUND OF THE INVENTION

Optical waveguide modulators used in high-speed optical communications, such as those based on waveguide Mach-Zehnder (MZ) interferometric structures, may require active control of their operating conditions, and in particular of their bias voltage that sets the relative phase of interfering light waves in the modulator. The waveguides of the modulator are typically formed in an electro-optic material, for example a suitable semiconductor or $LiNbO_3$, where optical properties of the waveguide may be controlled by applying a voltage. Such a waveguide modulator may be a part of an optical integrated circuit (PIC) implemented in an optoelectronic chip.

Very high speed optical systems may benefit from quadrature modulation formats such as Quadrature Phase-Shift Keying (QPSK) or Quadrature Amplitude Modulation (QAM). These types of optical modulation may be realized using a quadrature modulator (QM) that may be implemented using nested MZ interferometric structures. Such structures typically require controlling several bias voltages. For example, a QPSK or QAM optical signal may be generated by splitting light from a suitable light source between two MZ modulators (MZM) driven by an in-phase (I) and a quadrature (Q) components of an electrical signal carrying data, and then combining the resulting I and Q modulated light signals in quadrature, i.e. with a 90°, or π/2 radians (rad), relative phase shift $\phi_{IQ}$. For example each of the two MZMs of such QM may be modulated in a push-pull manner by a NRZ (non-return-to-zero) binary signal while being biased at their respective null transmission points to produce an optical BPSK modulation. When their outputs are added together in quadrature, i.e. with the relative phase shift $\phi_{IQ}=\pi/2$, a QPSK signal (Quaternary phase shift keying) results.

Various schemes for controlling bias set points of an optical IQ modulator have been disclosed. However, many of these schemes require high-bandwidth processing of the control signal which may be difficult or expensive to implement in practice. To ease constraints on the required electronics and improve the accuracy of the control system, bias control systems that use low-speed dither signals have been suggested. However, many of such systems require the detection of the dither frequency and integer multiples of it, which necessitates having a spectrally very clean, harmonic free dithering signal and corresponding dither detection system in order to avoid parasitic offsets. Furthermore, some bias control schemes that rely on low-frequency dither signals may work well for nearly ideal modulators capable of producing a high extinction ratio (ER) output, but less well for those generating low-ER signals. The term "extinction ratio" of an optical modulator conventionally refers to a ratio of 'ON' and 'OFF' optical power levels at the modulator output, typically expressed in decibels (dBs), when the modulator is operated to effect an ON-OFF keying (OOK) scheme. The ER reflects modulator imperfections, such as power imbalance between modulator arms of an MZM, and as such may be used as a measure of an optical modulator non-ideality for a variety of modulation formats.

Accordingly, it may be understood that there may be significant problems and shortcomings associated with current solutions and technologies for controlling a bias point of an optical waveguide modulator suitable for use in high-speed optical systems.

SUMMARY OF THE INVENTION

An aspect of the disclosure provides a method for controlling an operating point, or bias, of an optical modulator circuit in which two optical signals are added in quadrature to form an output optical signal. The method comprises modulating each of the two optical signals at two distinct dither frequencies $f_1$ and $f_2$ so that, when the two optical signals are added with a target quadrature optical phase shift therebetween, a single-sideband modulation at each of the dither frequencies results, with opposite-sign modulation sub-bands for the dither frequencies $f_1$ and $f_2$ being substantially cancelled, thereby out resulting in an optical spectrum in which there is no spectral lines separated by a difference frequency $f_{12}=|f_1-f_2|$. Thus, for an optical modulator with a high extinction ration (ER), the presence of a signal at the difference frequency in an output from a monitoring photo-detector (PD) may be used as an indicator of an error in the quadrature optical phase shift in the modulator. For optical modulators with a finite ER, an imbalance in modulator arms may contribute an ER-related component into the difference frequency signal in the absence of the errors in the quadrature optical phase shift. The ER-related component of the difference frequency signal may be filtered out using homodyne-type detection with a specific detection phase, which enables to separate a component of the difference frequency signal that vanishes when the two optical signals in the modulator are added in quadrature, and which sign is indicative of a direction in which the bias is to be adjusted to correct for the error in the quadrature optical phase in the modulator.

An aspect of the present disclosure relates to a method for operating an optical modulator comprising an input optical port for receiving input light, an output optical port configured to provide output modulator light and tapped light, two modulator arms extending optically in parallel between the input and output optical ports, and at least one optical phase tuner configured to control an optical phase of light propagating in one of the two modulator arms. The method comprises: a) modulating light propagating in one of the two modulator arms with a first dither signal $S_1$ at a first dither frequency $f_1$ and with a second dither signal $S_2$ at a second dither frequency $f_2 \neq f_1$; b) modulating light propagating in the other of the two modulator arms with a third dither signal S3 at the first dither frequency $f_1$ and with a fourth dither signal $S_4$ at the second dither frequency $f_2$, wherein the third dither signal $S_3$ is shifted in phase with respect to the first dither signal by 90 degrees, and the fourth dither signal $S_4$ is shifted in phase with respect to the second dither signal by (−90) degrees; c) detecting, in the tapped light, a dither signal at a difference frequency $f_{12}=|f_1-f_2|$ using a phase-sensitive detector; and, d) using the at least one optical phase tuner to adjust an optical phase difference $\Delta\Phi$ accrued between light propagating in the first and second waveguide arms so as to lessen the strength of at least a component of the detected dither signal at the different frequency.

The method may further include converting the tapped light into an electrical PD signal using a photodetector (PD), and mixing the electrical PD signal with a reference signal at the difference frequency. The converting may comprise using a lock-in detector configured to obtain two quadrature lock-in signals representing quadrature components of a dither oscillation at the difference frequency in the PD signal, said two quadrature lock-in signals being responsive to a detection phase of the reference signal.

The method may include multiplying the PD signal, or the signal obtained therefrom, with the reference signal in-phase with one of the first, second, third, and fourth dither signals, followed by averaging thereof over a time interval comprising one or more periods of the detected dither signal.

The method may include computing a phase-corrected lock-in signal corresponding to a pre-determined detection phase based on the two quadrature lock-in signals obtained from the lock-in detector, and adjusting the bias signal responsive to the phase-corrected lock-in signal.

The method may include using the detection phase for which one of the quadrature lock-in signals is substantially independent upon the bias signal, and adjusting the bias signal responsive to the other of the quadrature lock-in signals.

According to an aspect of the present disclosure, the method may include recording one of the two quadrature lock-in signals, or an error signal obtained from the two quadrature lock-in signals, for two or more values of a bias signal in a vicinity of a target set point thereof to collect bias scan data, processing the bias scan data to determine the slope information, and in subsequent steps, using the slope information to determine the direction in which the bias signal is to be adjusted, wherein the at least one optical phase tuners is responsive to the bias signal.

In accordance with one aspect of the disclosure, the method may be applied to a modulator apparatus that comprises a quadrature modulator configured to combine two modulated optical signals in quadrature, the quadrature modulator comprising a first optical phase shifter electrically coupled to the bias control port for varying an optical phase shift between the two modulated optical signals.

An aspect of the disclosure provides a method for controlling a bias of a quadrature optical modulator circuit comprising a first optical modulator comprising a first bias electrode and a second optical modulator comprising a second bias electrode, wherein the first and second optical modulators are connected in parallel between the input optical port and the output optical port so as to form an outer Mach-Zehnder interferometer (MZI) structure comprising a third bias electrode. The method may comprise: providing first, second, and third DC bias signal to the first, second, and third electrodes, respectively; providing a first dither tone at frequency $f_1$ to the first electrode and a 90 deg phase-delayed dither tone at frequency f2 to the second electrode, providing a dither tone at frequency $f_2$ to the second electrode and a 90 deg phase-delayed dither tone at frequency $f_2$ to the first electrode; detecting, in light tapped from an output of the outer MZI, an oscillation at a difference frequency $|f_1-f_2|$, so as to obtain at least one feedback signal that is responsive to an amplitude and a phase of said oscillation; varying the third DC bias signal in a vicinity of a target set point thereof; extracting, and saving in computer readable memory, slope information that is indicative of a direction of change of the at least one feedback signal, or an error signal obtained therefrom, relative to a change in the third DC bias signal; and adjusting the third DC bias signal in a direction determined using the slope information. The phase-sensitive dither detection circuit may comprise a lock-in detector connected to the PD.

One aspect of the present disclosure provides an optical modulator device comprising an input optical port for receiving input light, an output optical port configured to provide output modulator light and tapped light, first and second modulator arms each optically connecting the output optical port to the input optical port, and a plurality of electrodes comprising a first bias electrode coupled to the first modulator arm and a second bias electrode coupled to the second modulator arm. The plurality of electrodes is configured to adjust, responsive to a bias signal, optical phase of light propagating in one of the first and second modulator arms relative to the other of the first and second modulator arms, and to separately modulate light propagating in the first and second modulator arms responsive to one or more dither signals. A monitor photodiode (PD) disposed to receive the tapped light and to output a PD signal responsive thereto.

The optical modulator device further includes a controller operatively coupled to the plurality of bias electrodes and configured to provide to the first bias electrode a first dither signal $S_1$ oscillating at a first dither frequency $f_1$ and a second dither signal $S_2$ oscillating at a second dither frequency $f_2 \ne f_1$, provide to the second bias electrode a third dither signal $S_3$ oscillating at the first dither frequency $f_1$ and a fourth dither signal $S_4$ oscillating at the second dither frequency $f_2$, wherein the third dither signal $S_3$ is shifted in phase with respect to the first dither signal by 90 degrees, and the fourth dither signal $S_4$ is shifted in phase with respect to the second dither signal by (−90) degrees; and, provide the bias signal to at least one of the plurality of bias electrodes.

The optical modulator device further includes a phase-sensitive dither detector disposed to receive the PD signal and configured to detect therein a dither signal at a difference frequency a difference frequency $f_{12}=|f_1-f_2|$ and to output at least one feedback signal responsive to a phase of the detected dither signal at the difference frequency. The controller is configured to adjust the bias signal responsive to the at least one feedback signal.

The controller may comprise memory configured to store slope information that is indicative of a direction of change of the at least one feedback signal relative to a change in the at least one DC bias signal. The controller may further be configured to read the slope information from the memory and to adjust the at least one DC bias signal in a direction determined using the slope information. The optical modulator circuit may comprise an optical waveguide interferometer structure comprising one or more waveguide optical phase modulators.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
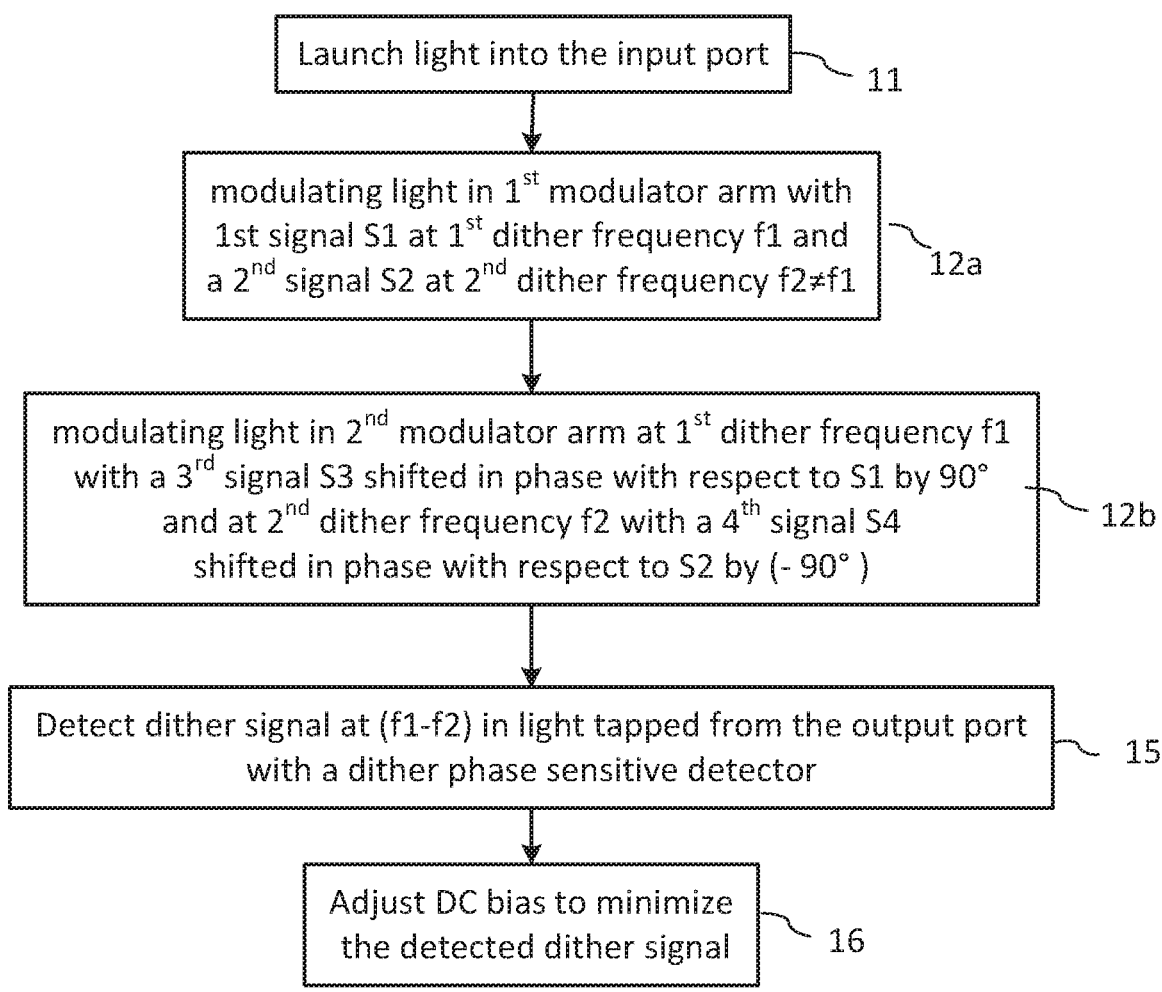
FIG. 1 is flowchart of a method for controlling the quadrature phase shift in a quadrature optical modulator.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
LiNbO$_3$ Lithium Niobate
PIC Photonic Integrated Circuits
SOI Silicon on Insulator
PSK Phase Shift Keying
BPSK Binary Phase Shift Keying
QAM Quadrature Amplitude Modulation
QPSK Quaternary Phase Shift Keying
RF Radio Frequency
DC Direct Current
AC Alternate Current Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation Vπ refers to a bias voltage of a Mach-Zehnder modulator (MZM) that corresponds to a change in a relative phase delay between arms of the MZM by π rad, or 180 degrees, which corresponds to a change from a minimum to a next maximum in the MZM transmission.

One aspect of the present disclosure relates to an optical waveguide modulator which must be suitably biased, or kept at a desired set point of its electro-optic transfer function, to have a desired modulation characteristic. An electrical signal that controls the modulator bias or set-point may be referred to herein as the bias control signal, or simply as the bias signal, and may be typically but not exclusively in the form of a bias voltage, which may be denoted Vb. It will be appreciated that main aspects of the method of the current disclosure apply to both voltage-controlled and current-controlled modulators. In operation an optical modulator may experience changes in some of its properties, for example due to changes in its temperature or due to internal modulator processes such as aging or impurity drift, which may cause a target value of the bias voltage that is required to maintain the desired modulator set point to drift, resulting in a deterioration of one or more aspects of the modulator performance, and therefore necessitating a means to monitor that drift and to adjust the bias voltage accordingly. One way to accomplish that is to monitor an output optical signal from the modulator to detect the drift, and to adjust the bias control signal or signals accordingly to compensate for those changes.

According to an aspect of the present disclosure, embodiments described hereinbelow relate to an optical interferometric modulator in which the output signal is obtained by a coherent addition of two optical signals with a phase shift $\Delta\Phi$ therebetween, and in which that shift is to be maintained during operation at a target value $\Delta\Phi_0$, substantially 90°, or $\pi/2$ rad typically. Examples of such modulators include, but not limited to, quadrature IQ modulators that may be used to generate optical QPSK and QAM signals; accordingly the phase shift $\Delta\Phi$ may also be referred to herein as the IQ phase shift and denoted $\phi_{IQ}$; it may also be referred to as the quadrature phase shift. In order to control the phase shift $\Delta\Phi$ and maintain it at the desired set point of $\pi/2$ rad, embodiments of the present disclosure may modulate the two optical signals at distinct dither frequencies $f_1$ and $f_2 \neq f_1$ in such a way that, when the optical signals so modulated are combined with the target quadrature optical phase shift $\Delta\Phi = \Delta\Phi_0 = \pi/2$, the resulting combined light is single-sideband modulated at each of these dither frequencies so that it includes only lower-frequency side-bands of the first dither frequency $f_1$ substantially without corresponding higher-frequency sub-bands, e.g. a single side-band tone at frequency $(f_{opt}-f_1)$ but substantially no $(f_{opt}+f_1)$ sub-band tone, and only higher-frequency side bands of the other dither frequency $f_2$, e.g. a single side-band tone at frequency $(f_{opt}+f_2)$ but substantially no $(f_{opt}-f_1)$ sub-band tone; here $f_{opt}$ denotes the frequency of the optical carrier. When this combined output light is detected with a monitoring photodiode (PD), the output PD signal from the monitoring PD, when properly detected, should not include a frequency component at the dither difference frequency $f_{12}=|f_1-f_2|$. A detuning from the $\Delta\Phi=\pi/2$ condition would however result in the appearance of the symmetrical dither sub-bands at frequencies $(f_{opt}+f_1)$ and $(f_{opt}-f_2)$, and a non-zero signal at the dither difference frequency $f_{12}=|f_1-f_2|$ in the PD signal from the monitoring PD. Accordingly, a component of the PD signal at the dither difference signal may be used as a feedback signal or an error signal when correcting for the quadrature phase shift error in an optical quadrature modulator, such as modulator 110 of FIG. 3.

With reference to FIG. 1, there is illustrated a flowchart representing general steps of method 10 for operating an optical quadrature modulator in which two optical signals separately propagating in two modulator arms are coherently combined to form an output optical signal of the modulator. As illustrated in FIG. 1 embodiment the method may start with, or after, step or operation 11 in which input light is launched into an input optical port of the modulator. At step or operation 12*a*, light propagating in one of the two modulator arms is modulated with a first dither signal $S_1$ at a first dither frequency $f_1$ and a second dither signal $S_2$ at a second dither frequency $f_2 \neq f_1$. Simultaneously, at step or operation 12*b* light propagating in the other of the two modulator arms is modulated with a third dither signal $S_3$ at the first dither frequency $f_1$ and with a fourth dither signal $S_4$ at the second dither frequency $f_2$. The third dither signal $S_3$ is shifted in phase with respect to the first dither signal $S_1$ by $\pi/2$, and the fourth dither signal $S_4$ is shifted in phase with respect to the second dither signal $S_2$ by minus $\pi/2$. For example in one embodiment $S_1$ may vary in time as $\sin(f_1 \cdot t)$, $S_2$ may vary in time as $\sin(f_2 \cdot t + \phi)$, $S_3$ may vary in time as $\sin(f_1 \cdot t + \pi/2) = \cos(f_1 \cdot t)$, and $S_4$ may vary in time as $\sin(f_2 \cdot t + \phi - \pi/2) = -\cos(f_2 \cdot t + \phi)$, where $\phi$ is an arbitrary phase shift and the dither signals satisfy the following equations:

$$S_1 = a_1 \cdot \sin(f_1 \cdot t), \qquad (1)$$

$$S_2 = a_2 \cdot \sin(f_2 \cdot t + \phi), \qquad (2)$$

$$S_3 = a_1 \cdot \sin(f_1 \cdot t + \pi/2) = a_1 \cdot \cos(f_1 \cdot t), \text{ and} \qquad (3)$$

$$S_4 = a_2 \cdot \sin(f_2 \cdot t + \phi - \pi/2) = -a_2 \cdot \cos(f_2 \cdot t + \phi), \qquad (4)$$

where $a_1$ and $a_2$ are constant dither amplitudes, which may be preferably but not necessarily equal. In one embodiment $\phi=0$.

The method may further include detecting in the output modulator light, or in light that may be tapped from a modulator output, a dither signal at a difference frequency $f_{12}=|f_1-f_2|$ at step or operation 15. The optical phase shift $\Delta\Phi$ in the modulator may then be adjusted at step or operation 16 so as to lessen the strength of the detected difference-frequency dither signal, or a component thereof. This acting may include using an optical phase tuner in one of the modulator arms, which may be configured to vary the refractive index and/or the optical path length in a portion thereof responsive to an electrical bias signal or to vary its optical length due to temperature changes.

When the two arms of the modulator are not ideally balanced, the elimination of the symmetrical sub-bands of the first and second dither frequencies $f_1$ and $f_2$ in the combined light may not be ideal even when $\Delta\Phi=\pi/2$, so that the combined light may still exhibit a residual intensity modulation at the difference frequency $f_{12}=|f_1-f_2|$ even for the best-case quadrature tuning. We found that this residual modulation, which is associated with a finite extinction ratio (ER) of the modulator, can be substantially filtered out using phase-sensitive detection of the difference frequency signal, leaving only the component that is indicative of the quadrature phase error.

Accordingly, in one embodiment the detecting of the difference signal at step 15 may include using a phase-sensitive detector to detect the strength of a specific component of the detected PD signal at the dither difference frequency $f_{12}$. This phase-sensitive detection may include sampling of the electrical signal $S_{PD}$ from the monitoring PD at the modulator using a reference signal $S_{ref}$ oscillating at the difference frequency $f_{12}$, and then detecting the strength of the so sampled component of the mixed signal. The reference signal $S_{ref}$ may also be referred to as the sampling signal or the local oscillator (LO) signal. This sampling may include averaging a product of the electrical PD signal $S_{PD}$ and the reference signal $S_{ref}$, which may be synchronized to a dither clock, over a time interval T containing multiple periods of the difference frequency oscillation. The averaging may include integrating of the product over the time interval T. In analog domain it may include homodyne mixing of the electrical signal $S_{PD}$ with an LO signal centered at the difference frequency signal $f_{12}$, and then detecting the strength of a DC component of the mixed signal. Another embodiment may include heterodyne mixing of the electrical signal $S_{PD}$ from the monitoring PD at the modulator output with a reference signal $S_{ref}$ centered at a heterodyne frequency $f_{het}=f_{dif}\backslash-f_{IF}$, and then detecting the strength of a component of the mixed signal at the intermediate frequency $f_{IF}$. When the reference or LO signal $S_{ref}$ is in a specific phase relationship with the difference-frequency dither oscillation in the PD signal $S_{PD}$, the detected component of the difference frequency oscillation may substantially vanish for the ideal quadrature phase tuning $\Delta\Phi=\pi/2$ even for a relatively low ER of the modulator, so that the strength of that component may serve as the error signal when tuning the bias signal controlling the quadrature phase. In at least some embodiments, this specific phase relationship corresponds to the reference signal $S_{ref}$ being in-phase with one of the dither signals $S_1$, $S_2$, $S_3$, and $S_4$ at the phase-sensitive detector at the beginning of a sampling or integration period.

In one embodiment, the phase sensitive detection of the dither frequency signal may include using a lock-in detector. Such a detector may be configured to produce an output signal by mixing or correlating an input signal with a reference signal at the dither difference frequency $f_{12}$, and integrating the mixed signal over a number of periods $T_{12}=1/f_{12}$ of the dither oscillation being detected. In one embodiment the lock-in detector may output two quadrature lock-in signals Us and Uc, with Us being proportional to a product of the electrical PD signal $U(t) \equiv S_{PD}$ to a sine waveform at the dither difference frequency $f_{12}$, and Uc being proportional to a product of the electrical PD signal U(t) to a cosine waveform at the dither difference frequency $f_{12}$:

$$U_s = \frac{1}{T}\int U(t)\sin(f_{12}t + \theta)dt, \text{ or} \quad (5)$$

$$U_c = \frac{1}{T}\int U(t)\cos(f_{12}t + \theta)dt, \quad (6)$$

where θ, which may be referred to herein as the detection phase, is the phase of the reference signal relative to an integration interval of the detected signal, and T is the duration of the integration interval. The DC lock-in signals Us and Uc given by equations (5) and (6), which may be referred to as the sine lock-in signal and the cosine lock-in signal respectively, represent two quadrature components of the detected oscillation. It will be appreciated that the 'sine' and 'cosine' designations are arbitrary and may be effectively switched by the choice of the detection phase θ.

If the detection phase θ is set to be in a specific relationship with the phase of the difference-frequency oscillation being detected, one of these two quadrature components Us and Uc is indicative of the quadrature phase error $\delta\Phi=(\Delta\Phi-\pi/2)$ but is relatively insensitive to the ER of the modulator, while the other of these two quadrature components carries information about the ER but is relatively insensitive to the quadrature phase error $\delta\Phi$.

Figure 2A:
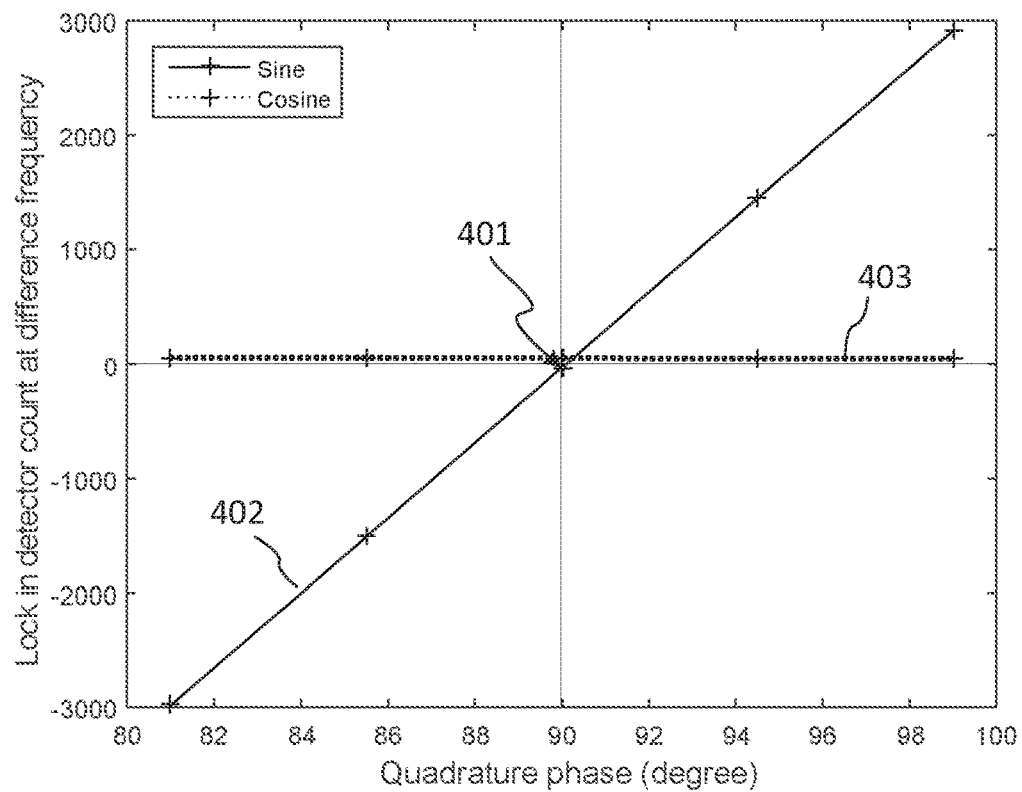
FIG. 2A is a graph illustrating two quadrature output signals of a lock-in detector tuned to the frequency difference signal in dependence upon the quadrature phase shift in the modulator for a high-ER modulator with ER >100 dB, when the detection is in-phase with a component of the difference frequency oscillation related to the IQ phase error in the modulator.
Figure 2B:
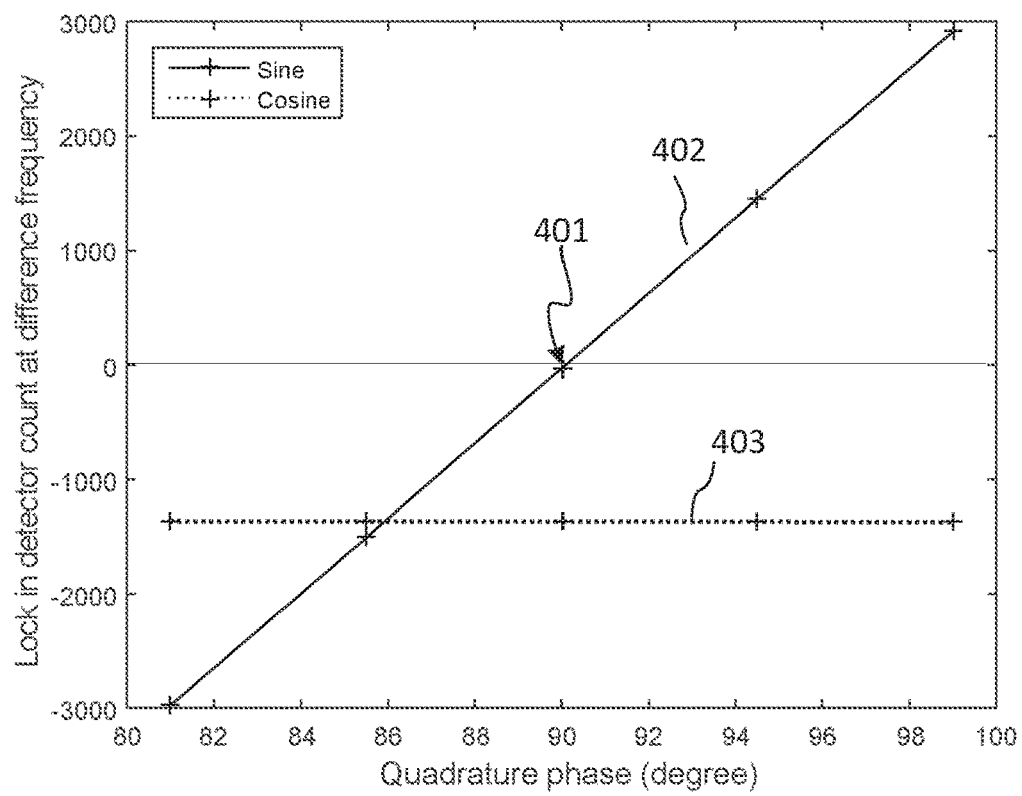
FIG. 2B is a graph illustrating two quadrature output signals of a lock-in detector tuned to the frequency difference signal in dependence upon the quadrature phase shift in the modulator for a lower-ER modulator with ER ~20 dB, when the detection is in-phase with a component of the difference frequency oscillation related to the IQ phase error in the modulator.

FIGS. 2A and 2B illustrate simulation results for the Us and Uc signals in the output of a non-ideal quadrature modulator versus quadrature phase error of the modulator when the dither signals are in the form of sine and cosine oscillations as defined by equations (1)-(4) hereinabove with $\phi=0$, and the sine-wave component of the reference signal is in-phase with the first dither signal $S_1$; the modulator of FIG. 2A has a very high ER of >100 dB while the modulator of FIG. 2B has a lower ER of about 20 dB. In both cases, the sine lock-in signal Us 402 is proportional to the quadrature phase error $\delta\Phi$ and crosses zero 401 at $\Delta\Phi=\pi/2$ rad or 90 degrees, while the cosine lock-in signal Uc 403 is inversely proportional to the ER but is independent on the quadrature optical phase error $\delta\Phi$.

Figure 2C:
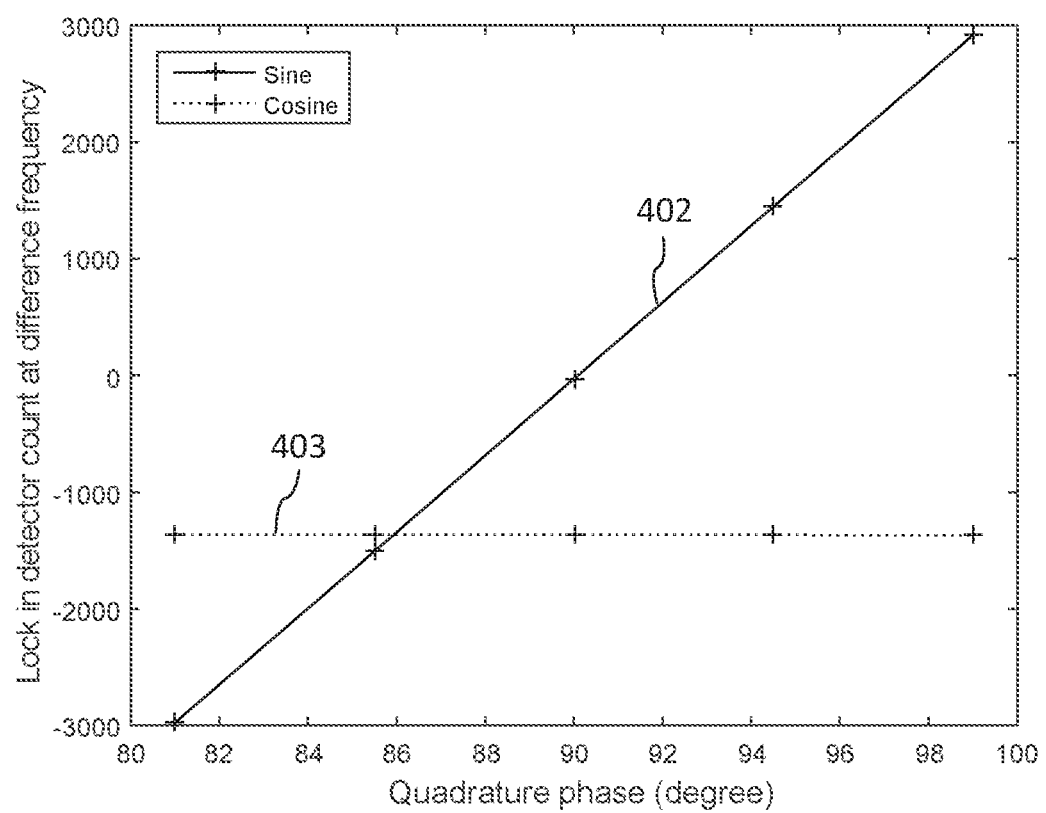
FIG. 2C is a graph illustrating the two quadrature output signals of FIG. 2B in dependence upon the quadrature phase shift in the modulator when the detection phase is out of phase with the component of the difference frequency oscillation that is related to the IQ phase error in the modulator.

The separation of the ER-sensitive and quadrature phase sensitive components of the difference-frequency dither signal for a non-ideal modulator with a low to moderate ER holds however only for specific phase relationships between the dither signal being detected and the reference signal, and may break down when the detection phase θ differs from its optimal value, for example due to dither signal and/or reference signal delays in the modulator system. This is illustrated in FIG. 2C, which shows simulation results for Us and Uc when the detection phase relative to the dither signal $S_1$ at the lock-in detector θ is 72 degrees. In this case Us and Uc lock-in signals each is a mixture of the ER-sensitive and $\Delta\Phi$-sensitive components of the difference-frequency oscillation, so that neither their crossing nor the crossing of any one of them with the y-axis zero represents the correct quadrature phase setting of 90 degrees.

Accordingly, in one embodiment the method of FIG. 1 may include setting the detection phase of the lock-in amplifier to the specific setting wherein one of the Us and Uc components of the detected dither signal is independent on the quadrature phase of the modulator. In one embodiment, this may include varying the phase of the reference signal, or the detection phase of the lock-in detector, until one of the quadrature signals Us and Uc becomes substantially independent on a modulator bias that controls the quadrature phase shift in the modulator.

In one embodiment, the output of the lock-in detector may be rotated to convert measured quadrature signals Us and Uc to new quadrature signals Us' and Uc' that correspond to the desired detection phase in the lock-in detector at which one of these two phase-corrected lock-in signals Us' and Uc' becomes substantially independent on a modulator bias that controls the quadrature phase shift in the modulator, and using the other of the two phase-corrected lock-in signals as an error signal for adjusting the quadrature phase $\Delta\Phi$. This rotation may be performed for example using digital logic implementing vector rotation with a simple rotation matrix as illustrated by equation (5):

$$\begin{pmatrix} Us' \\ Uc' \end{pmatrix} = \begin{pmatrix} \cos(\theta_r) & -\sin(\theta_r) \\ \sin(\theta_r) & \cos(\theta_r) \end{pmatrix} \begin{pmatrix} Us \\ Uc \end{pmatrix} \quad (5)$$

where $\theta_r$ is the rotation angle or phase. In some implementations $\theta_r$ may be varied, for example during the device calibration, until the desired behavior of Us' or Uc' as functions of the IQ bias setting is obtained. In such embodiment the actual detection phase θ of the lock-in detector may be arbitrary, and the detection phase correction is performed by post-processing of the detected quadrature signals Us and Uc using a stored value of the rotation angle that was determined based on bias scan data.

Figure 3:
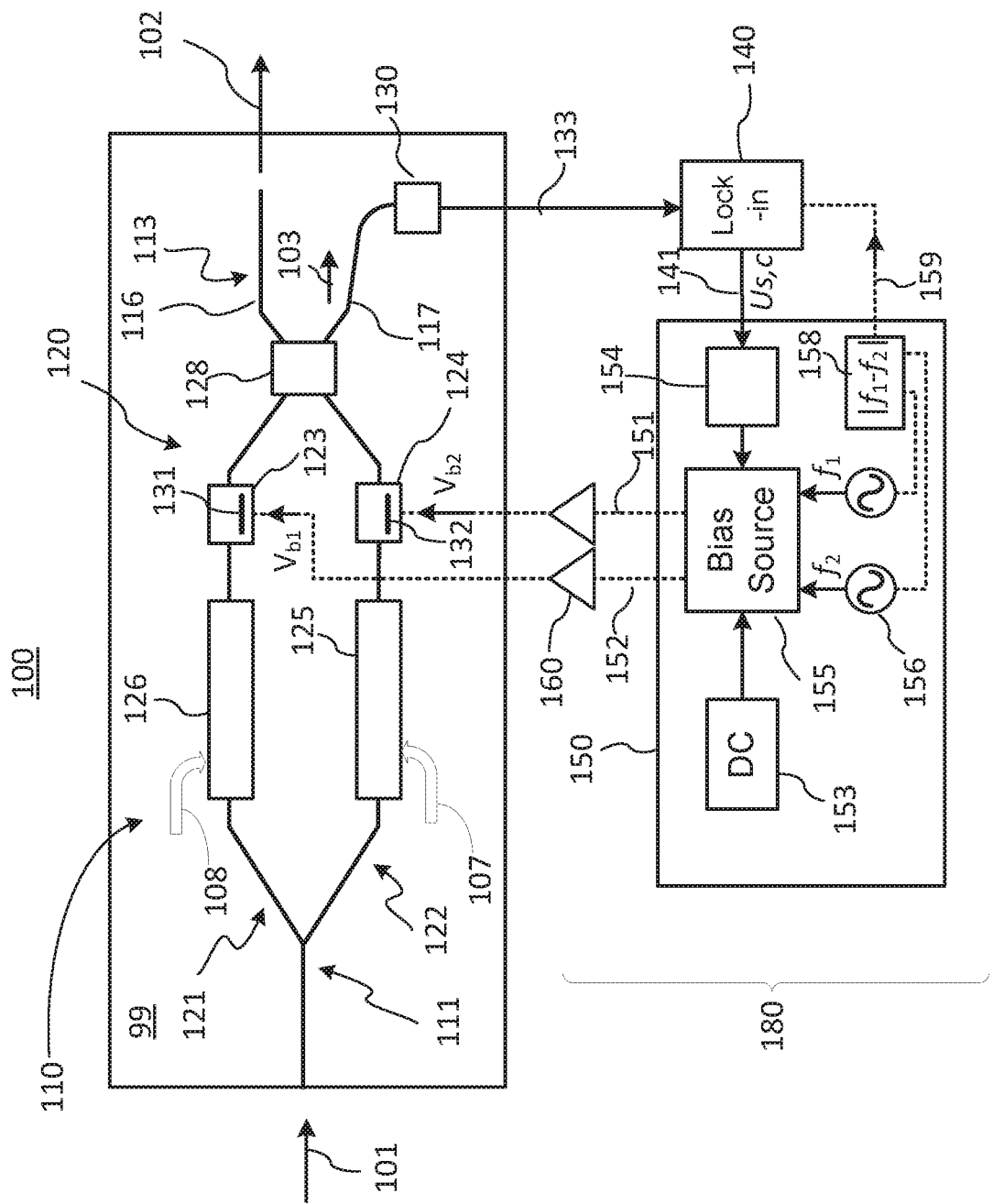
FIG. 3 is a schematic diagram of an optical Mach-Zehnder modulator (MZM) with an optoelectronic bias control circuit incorporating a phase tuner in each of two MZM arms for applying dither frequencies, and a phase-sensitive dither detection circuit.
Figure 10:
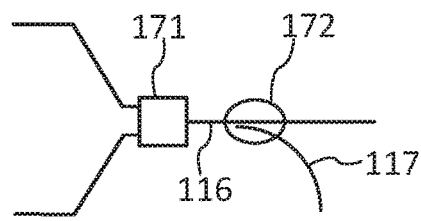
FIG. 10 is a schematic diagram of an output section of an optical modulator incorporating an output optical combiner in the form of a directional coupler followed by a tap coupler.

Turning now to FIG. 3, there is schematically illustrated an example optical modulator device 100 which is configured to implement an embodiment of method 10 of FIG. 1 for an automatic adjustment of the modulator' bias to keep the optical phase shift $\Delta\Phi$ in the modulator at its quadrature set point. The modulator device 100 includes an optical waveguide modulator 110 formed by an optical splitter 111, an optical combiner 128, and two modulator arms 121 and 122 extending optically in parallel therebetween. The optical splitter 111 may function as an input optical port of the modulator 110, while the optical combiner 128 may function as the output optical port. The optical combiner 128 may be configured to provide tapped light 103 in addition to output modulator light 102. The output modulator light 102, which may also be referred to as the main output light 102 or simply as the output light 102 and which may carry data, is guided out of the modulator by an output waveguide 116 to be transmitted along a data path of an optical communication system to an optical receiver at another end of an optical communication link (not shown). The tapped light 103 is coupled into a monitoring PD 130 with tap waveguide 117. Each of the input optical splitter 111 and the output optical combiner 128 may be embodied using any waveguide structures commonly known to provide the respective functionalities. For example the optical splitter 111 may be in the form of a Y-branching waveguide splitter, a directional coupler, or a 2×2 multi-mode interference (MMI) coupler. The optical combiner 128 may be, for example, in the form of a 2×2 MMI coupler or a directional optical coupler followed by an optical tap coupler, as illustrated in FIG. 10.

In the illustrated embodiment the optical splitter 111, the optical combiner 128, and the modulator arms 121, 122 form a Mach-Zehnder Interferometer (MZI) stricture 120. The modulator arms 121, 122, which may be formed of two optical waveguide and may be also referred to as waveguide arms, include optical modulators 125 and 126, one in each of the modulator arms. The optical modulators 125 and 126 may also be referred to as the inner modulators 125, 126. The modulator arms 121, 122 may also include one or more optical phase tuners for controlling a set point of the modulator 110; in the illustrated embodiment two optical phase tuners 123 and 124 are shown, one in each of the modulator arms 121, 122. It will be appreciated that the modulator arms 121 and 122, although connected optically in parallel to each other, do not have to be geometrically parallel.

Figure 9:
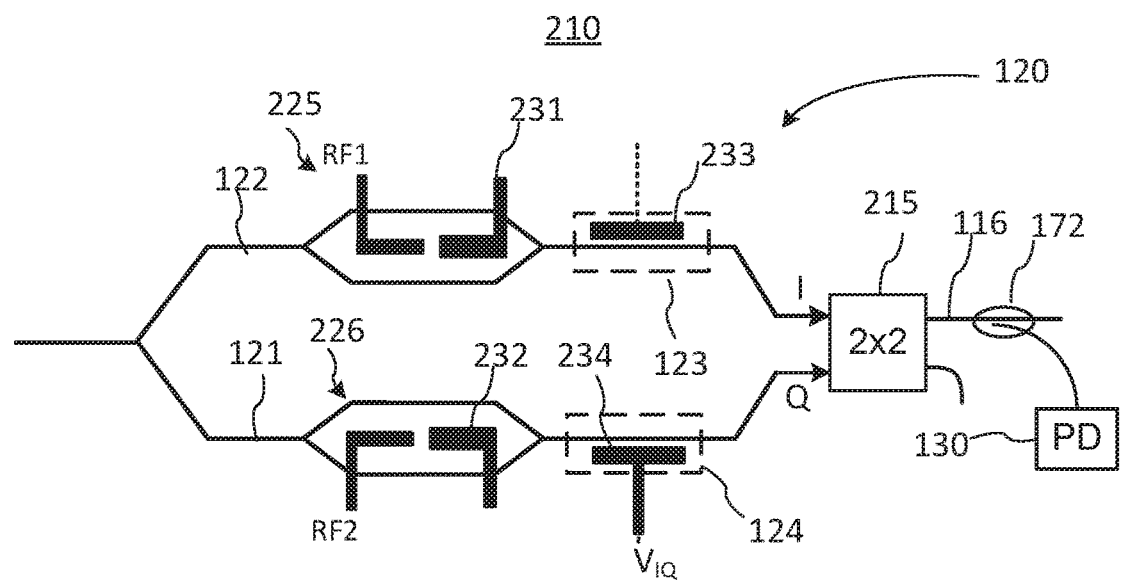
FIG. 9 is a schematic diagram of an embodiment of the optical modulator of FIG. 3 with two inner MZMs in modulator arms.

The optical phase tuners 123, 124 may be in the form of, or include, bias electrodes 131, 132 that are disposed and/or otherwise configured so as to vary the refractive index and/or the optical path length in a portion of the respective modulator arm 121, 122 in response to an electrical bias signal, which are controlled by a controller 150 of an electrical bias control circuit 180. Each of the inner modulators 125, 126 typically includes at least one signal electrode (not shown) that provides an electrical modulating signal 107 or 108 to the respective inner modulator for modulating an optical phase and/or an optical amplitude of input light 101 as it propagates in one or more waveguides forming the waveguide interferometric structure of the OMC. In one embodiment the inner modulators 125, 126 may be each in the form of an MZM as illustrated in FIG. 9.

In operation input light 101 received by the modulator is split by the optical splitter 111 into two preferably but not necessarily equal portions, which are guided along two different optical paths by the waveguide arms 121, 122 to the output port or combiner 128, where they are coherently recombined with an optical phase shift $\Delta\Phi$ therebetween to form output modulator light 102. In order to ensure proper operation of the optical modulator 120, the optical phase shift $\Delta\Phi$ should be set to a specific target set-point value $\Delta\Phi^0$. In example embodiments described hereinbelow, the target set-point value $\Delta\Phi^0$ of the phase shift $\Delta\Phi$ corresponds to a mid-point of the modulator transmission curve $I_{out}(Vb)$ of the optical MZI 120, and is equal substantially to $\pi/2$ radian (rad), or 90°, so that optical signals from both arms 121, 122 of the MZI 120 are added in quadrature at the output of the modulator 120; here $I_{out}(Vb)$ denotes the optical power of the output light 102 as a function of a DC bias voltage Vb applied to one of the phase tuners 123, 124. Accordingly the optical phase shift $\Delta\Phi$ in modulator 110 is referred to as the quadrature phase shift, and the modulator 110 as the quadrature modulator.

The phase tuners 123, 124 may be used to adjust the quadrature phase shift $\Delta\Phi$ in the modulator during its operation in response to a drift in modulator properties, so as to maintain the modulator 120 at the desired quadrature set point $\Delta\Phi=\Delta\Phi^0=\pi/2$. In the illustrated embodiment the phase tuners 123, 124 are also used to modulate the two light portions propagating in the waveguide arms 121, 122 in accordance with method 10 described hereinabove, so as to result in two single sub-bands asymmetrically disposed at opposite sides of the optical carrier when the respective light portions are combined with the target optical phase shift therebetween. The appearance of symmetrical sub-bands in the combined light 102 or 103 due to a quadrature phase error in the modulator 110 may be detected using a monitoring PD and a phase-sensitive detector, which may be tuned to providing a feedback signal that is indicative of the modulator quadrature error $\delta\Phi=(\Delta\Phi-\pi/2)$.

Continuing to refer to FIG. 3, in operation the monitoring PD 130 generates an electrical PD signal 133 responsive to variations in the intensity of tapped light 103. The bias control circuit (BCC) 180 forms a feedback loop between the monitoring PD 130 and the phase tuners 124, 123 and may also be referred to herein as the electrical feedback circuit. The BCC 180 includes a bias controller 150 that connects to the phase tuners 123, 124, possibly by means of electrical drivers 160. The controller 150 is configured to generate bias control signals 151, 152 which may include each a DC bias signal $S_{DC}$ and a distinct dither signal $S_{dith}$, $S=S_{DC}+S_{dith}$. Accordingly, the controller 150 may include one or more dither signal sources 156, a DC bias source 153, and a summing circuit. The electrical drivers 160 suitably condition the bias control signals 151, 152 and provide them to the phase tuners 123, 124, typically in the form of bias voltages Vb1 and Vb2. The DC components of the bias control signals 151, 152 may also be referred to herein as the DC bias signals. By tuning a DC component of one or both of the bias control signals 151, 152, the quadrature phase shift $\Delta\Phi$ in the modulator 120 may be adjusted.

In operation, the controller 150 sets the DC components $S_{DC}$ of one or both of the bias control signals 151, 152 so as to bring the quadrature phase shift $\Delta\Phi$ at or near its target value. The controller 150 also adds a first dither signal $S_1$ at the first dither frequency $f_1$ and a second dither signal $S_2$ at the second dither frequency $f_2 \neq f_1$ to one of the bias control signals 151 and 152. Simultaneously, the controller 150 also adds a third dither signal $S_3$ at the first dither frequency $f_1$ and a fourth dither signal $S_4$ at the second dither frequency $f_2$, wherein the third dither signal $S_3$ is shifted in phase with respect to the first dither signal $S_1$ by $\pi/2$, and the fourth dither signal $S_4$ is shifted in phase with respect to the second dither signal $S_2$ by minus $\pi/2$. In one embodiment the dither signals may be in the form of sine and cosine waveforms as defined by equations (1)-(4). The amplitudes $a_1$, $a_2$ of the dither signals at the bias electrodes may be selected to be small enough so as not to interfere with the modulator operation, for example smaller than $V\pi/5$ or preferably smaller than $V\pi/10$, but still large enough to be detectable over noise in the PD signal 133 and to provide sufficient accuracy of the bias set-point tracking. The dither frequencies $f_1$ and $f_2$ are preferably small compared to the data rate of the modulator operation, and may be for example in the range from a few kilohertz to a few megahertz, but could also be outside of that range.

The BCC 180 further includes a phase-sensitive dither detector 140 that is coupled to PD 130 and is configured to detect in the PD signal 133 a dither signal at the dither difference frequency $f_{12}=|f_1-f_2|$ in a phase sensitive manner, generally as described hereinabove with reference to method 10. The phase-sensitive detector 140 may be embodied as a lock-in detector configured to sample the PD signal 133 using a reference signal 159 at the difference frequency $f_{12}$ and to produce at least one of the two quadrature lock-in signals Us and Uc, which measure quadrature components of the difference-frequency oscillation being detected and which may be generally as given by equations (5) and (6). The lock-in detector 140 may receive its clock or reference signal 159 at the dither difference frequency $f_{12}$ from controller 150, which may include difference-frequency signal generator 158 that is synchronized to the dither signal sources 156 that generate the two distinct dither frequencies $f_1$ and $f_2$.

As described hereinabove with reference to FIGS. 1, 2A-2C, the lock-in signals Us and Uc depend on the detection phase θ at the lock-in detector 140, and for a particular value θ* of this detection phase one of the quadrature lock-in signals Us, Uc is indicative of the quadrature phase error δΦ in the modulator 110 and the other is indicative of the ER of the modulator but is substantially independent on the quadrature phase error δΦ. Accordingly, in one embodiment the lock-in detector 140 may be configured so that θ=θ*, and one of the quadrature lock-in signals Us and Uc that is indicative of the quadrature phase error δΦ, for example Us, is sent to controller 150 as the feedback signal 141. Controller 150 may include bias control logic 154 configured to adjust the DC bias on one or both of the phase tuners 124, 123 in response to the feedback signal 141, for example so as to substantially minimize it or at least reduce its magnitude. This logic may use the sign of the selected lock-in signal as received from the lock-in detector, for example Us, and a sign of the slope of the function Us(Vb), which may be known from calibration, to determine the direction in which the bias voltage at one or both of the phase tuners needs to be adjusted, and the absolute value of the received lock-in signal to determine the size of the bias signal adjustment.

Figure 4:
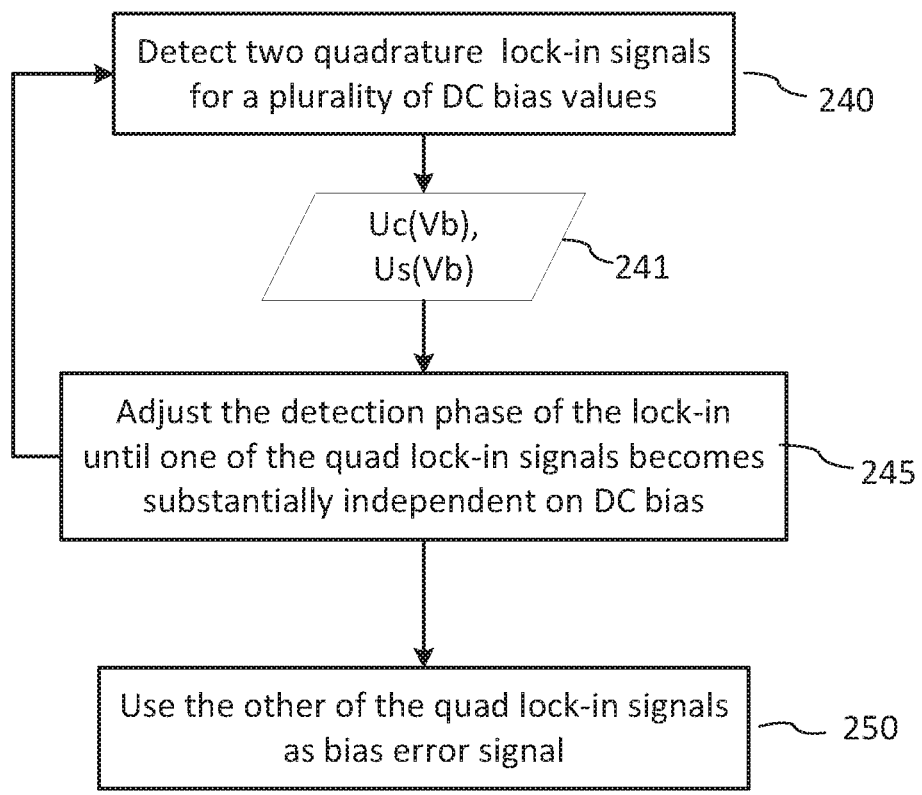
FIG. 4 is a flowchart of a method for adjusting the detection phase of the lock-in detector in the modulator device of FIG. 3.
Figure 8A:
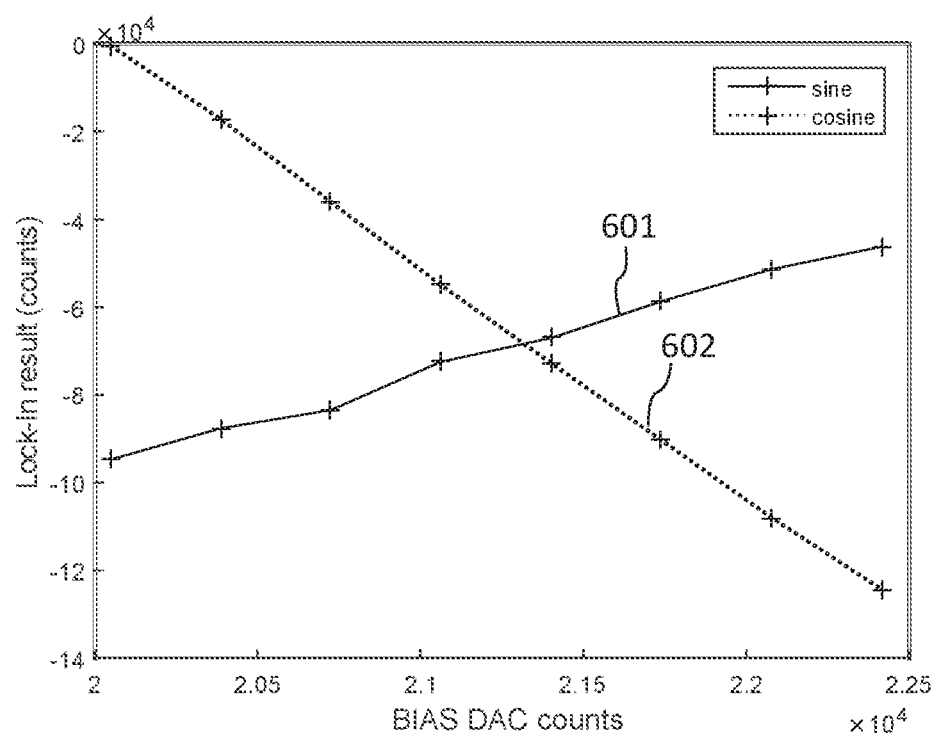
FIG. 8A is a graph illustrating measured quadrature output signals of the lock-in detector tuned to the dither difference frequency vs. the quadrature phase shift in terms of bias DAC counts for an example modulator for non-optimal detection phase of the lock-in detector.

FIG. 4 illustrates process 201 for calibrating the BCC 180 in accordance with one embodiment of the present disclosure. Process 201 may be employed when the modulator device 100 is not used to transmit user data, for example at the factory, in the startup phase or when the modulator is idle. As illustrated, process 201 may start once operations corresponding to steps 11, 12a, and 12b of method 10 are executed, as described hereinabove with reference to FIG. 1 and FIG. 3. In this embodiment controller 150 may be configured to scan the DC component of the bias signal 151 or 152 over a plurality of DC bias values, measure the two quadrature lock-in signals Us and Uc for a particular detection phase of the lock-in 140 while the DC bias is being scanned, and record these measurements into bias scan data 241, as indicated at block 240 in the figure. The bias scan data 241 indicates how the two quadrature lock-in signals Us and Uc vary as functions of a bias voltage Vb for a given lock-in detection phase θ. An example of such measurements is presented in FIG. 8A, where the sine lock-in signal Us for a plurality of bias signal values is represented at 601, and the cosine lock-in signal Uc for the same bias signal values is represented at 602. The bias signal values are shown along the horizontal axis in bias DAC counts for an embodiment of the modulator device 100 which includes a DAC at the output of the controller 150 to convert digital bias signals 152, 151 into analog signals. Referring back to FIG. 4, the lock-in phase θ is adjusted and the measurements at block 240 are repeated until it is found that one of the lock-in signals, for example Uc, is substantially independent on the bias voltage Vb. The detection phase θ of the lock-in signal is then set to the corresponding value, and the controller 150 is configured to use the other of the two quadrature lock-in signals, for example Us, as the feedback signal for the bias control logic 154, as indicated at block 250 in FIG. 4. In one embodiment controller 150 may save the slopes of the dependence Us(Vb), or at least the sign thereof, as a feedback sensitivity parameter for use in the feedback control algorithm implemented by logic 154. The process of dynamic bias control may include repeatedly measuring one or both of the lock-in signals Us and Uc, for example at prescribed time intervals, and adjusting the DC bias Vb after each measurement, or when deemed necessary, in a direction determined by the current measured value of the lock-in signal, or the sign thereof, and the stored slope s.

Varying a DC bias signal Vb to collect the bias scan data 241 may be disruptive to normal operation of the modulator device, and therefore in some embodiments steps 240 of process 201 may be performed during the device calibration, during the startup phase or when the modulator device is idle. Since the dither to reference signal phase delay is not expected to vary significantly during operation of the modulator device, the slope information s saved during calibration may be used at a later time during the device operation to determine the direction of the bias adjustment when dynamically tracking variations in the modulator set point.

Figure 5:
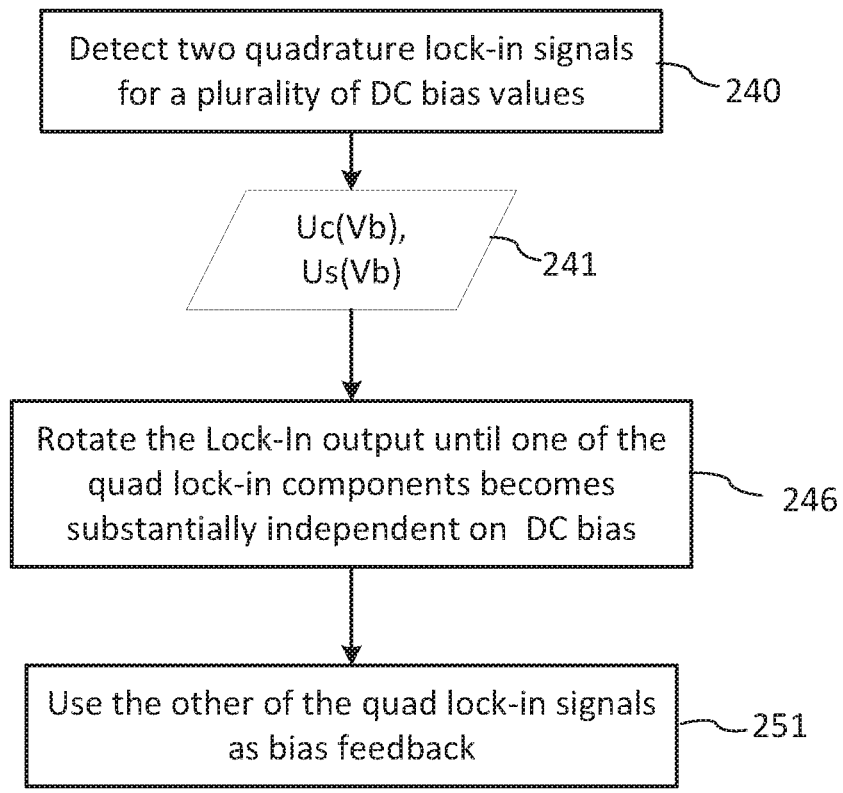
FIG. 5 is flowchart of a detection phase calibration process in the lock-in detector in one embodiment of the method of FIG. 1.
Figure 6:
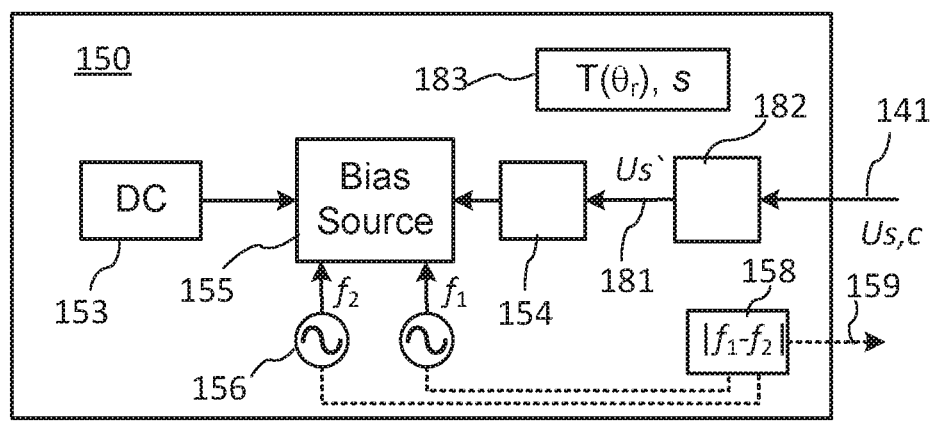
FIG. 6 is a schematic functional block diagram of lock-in signal processing logic using calibration data obtained with process of FIG. 5 for an embodiment of the modulator device of FIG. 3.
Figure 8B:
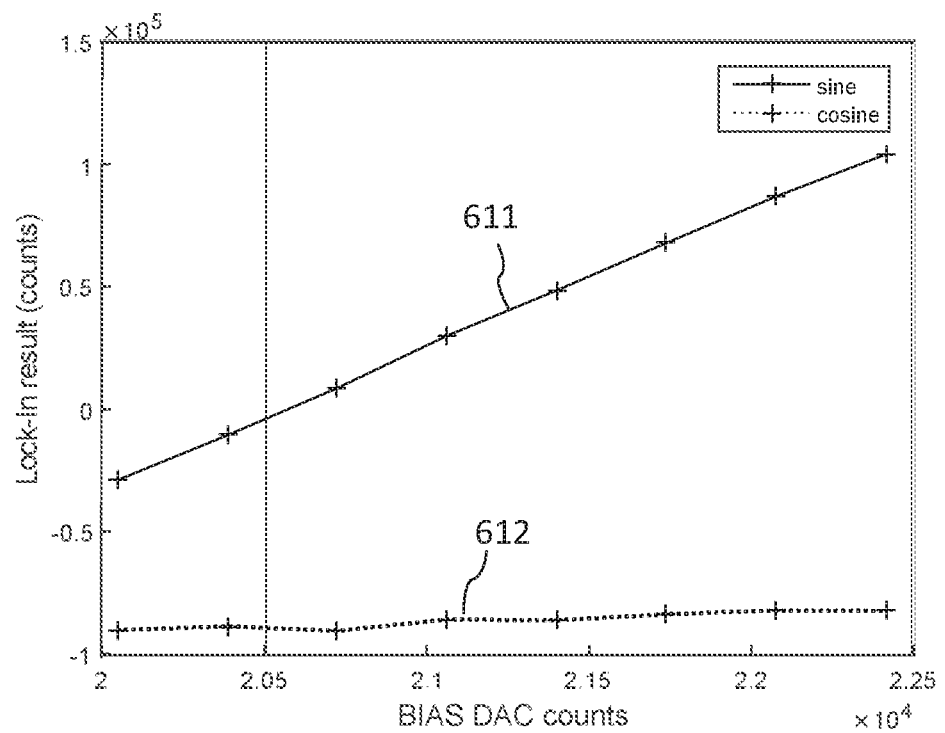
FIG. 8B is a graph illustrating the quadrature output signals of the lock-in detector of FIG. 8A after a phase rotation to compensate for the non-optimal detection phase.

With reference to FIGS. 5 and 6, in one embodiment controller 150 may be configured to implement a process 202 for calibrating the BCC 180 to account for a phase mismatch between the reference lock-in signal 159 and the difference-frequency dither oscillation being detected in the PD signal. FIG. 5 shows a flowchart of an example calibration process, while FIG. 6 shows relevant features of a functional block diagram of an embodiment of the controller 150 configured to control the modulator bias using calibration data obtained with process 202. Process 202 is based on an observation that the quadrature lock-in signals Us, Uc for any detection phase θ contain full phase information about the oscillation being detected, and may be re-calibrated to the desired detection phase, for example by implementing a rotation operation represented by equation (5). The effect of varying the lock-in phase θ by a phase delay or angle $θ_r$ upon the quadrature lock-in signals Us and Uc can then be presented as a rotation of a vector (Us, Uc) by an angle $θ_r$. Accordingly, process 202 may be viewed as a modification of process 201 wherein, instead of actually tuning the detection phase θ of the lock-in 140 and recording the lock-in signal bias scans Us(Vb), Uc(Vb) for a plurality of lock-in phases θ, the bias scan step 240 is performed for a set lock-in phase θ, which may be defined by electrical and optical delays in the modulator device 100 from the dither sources 156 to the lock-in detector 140 and is likely to vary little over time. Then, at step 246, the measured bias scan data Us(Vb), Uc(Vb) 241 is rotated using suitable data processing logic 182 at controller 150, until one of the quadrature components Us' and Uc' of the rotated complex lock-in signal (Us', Uc'), for example the rotated cosine component Uc', becomes substantially independent on the bias voltage Vb. This is illustrated in FIG. 8B, where the sine lock-in signal Us' for the rotated detection phase is represented by curve 611, and varies linearly with Vb crossing zero for the optimum modulator bias. The rotated cosine lock-in signal Uc' corresponding to the rotated detection phase is represented by curve 612, which is substantially independent on Vb. The corresponding rotation angle $\theta_r^*$, or a rotation matrix $T(\theta_r^*)$ for that angle, may be saved in memory 183. The controller 150 may also save in memory the slope parameter s, i.e. the rate of change with bias of the rotated lock-in signal Us', or Uc' in other embodiments, that is responsive to the bias signal Vb.

Figure 7:
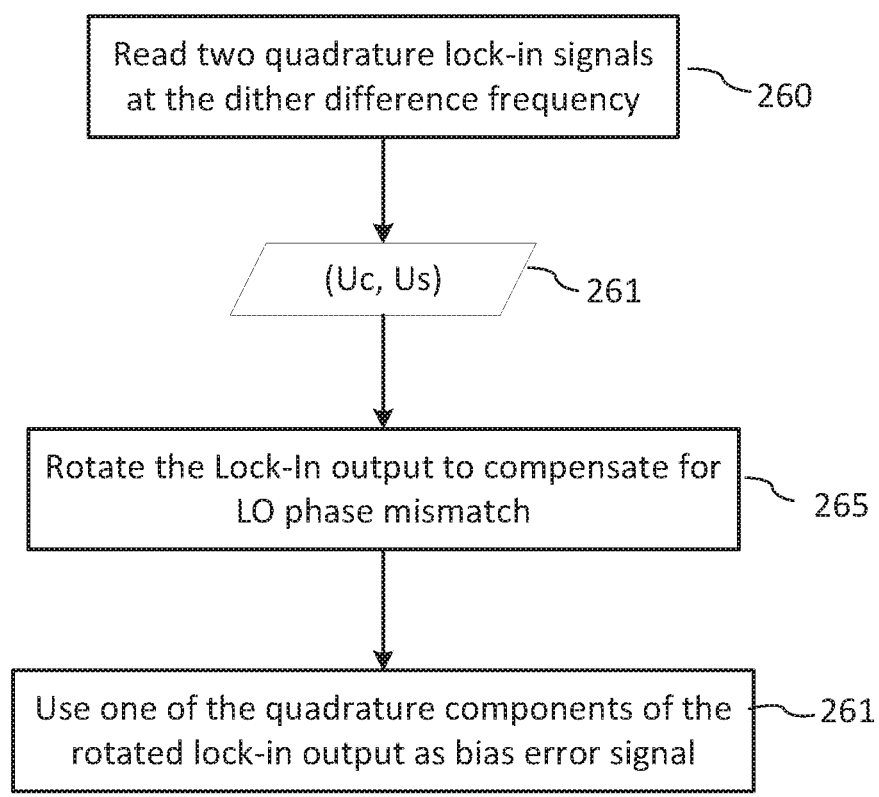
FIG. 7 is a is flowchart of a process for obtaining a bias error signal using detection phase calibration data and post-detection phase rotation for the modulator of FIG. 3.

Referring now also to FIG. 7, in operation controller 150 may be configured to follow process 203 to automatically adjust the DC bias of the modulator 110 using the saved rotation angle or matrix. This process may include the following steps or operations: at step 260 measuring the two quadrature lock-in signals Us, Uc 261 from the output of the lock-in detector 140; at step 265 rotating the measured lock-in signals Us, Uc 261 by the rotation angle $\theta_r$ that was determined during calibration, for example using rotation matrix $T(\theta_r)$ $$T(\theta_r) = \begin{pmatrix} \cos(\theta_r) & -\sin(\theta_r) \\ \sin(\theta_r) & \cos(\theta_r) \end{pmatrix}$$

which elements may be saved in memory 183 at the calibration stage, and at step 270 providing the selected quadrature component of the rotated, i.e. phase-corrected, lock-in output that is responsive to the bias signal, to the bias adjustment logic 154 as the error signal.

By way of example, at the device calibration stage the controller may use the process 202 to determine the rotation angle $\theta_r$, or the corresponding rotation matrix $T(\theta_r)$, for the measured lock-in signals Us and Uc that converts them into two quadrature signals Us' and Uc' wherein Uc' is substantially independent on Vb, and Us' is approximately linearly dependent on Vb with a slope $s \sim \Delta Us'/\Delta Vb$. The rotation matrix T(Or) and the slope s are then saved in memory 183 of the controller 150. In operation controller 150 may read current values of the quadrature lock-in signals Us and Uc from the output of the lock-in detector 140, rotates them using the saved phase rotation matrix to compute Us', and if an absolute value of Us' exceeds a pre-determined threshold, adjusts the DC bias voltage Vb in a direction defined by the sign of Us' and the sign of the saved slopes. For example if s and Us' are of the same sign, Vb may be decreased by a small value. If the signs of s and Us' are different, Vb may be increased. In some embodiments the size of the bias voltage increment $\Delta Vb$ may be set in advance, for example in a range of 0.01V to 0.05V, or a few percent of $V\pi$ for the modulator, so as to ensure a smooth operation of the modulator without abrupt changes in its modulation characteristic. In some embodiments, the size of the bias voltage increment $\delta Vb$ may be dynamically determined in dependence on the detected values of the feedback signal Us and/or Uc, or a selected rotated signal, optionally in combination with the stored slope value s, using any suitable control algorithm. By way of example, in one embodiment the bias control logic 154 may implement a PID control algorithm wherein the size of the bias voltage increment $\delta Vb$ is dynamically determined in dependence on last several detected values of the feedback signal Us and/or Uc 141 or 181. In some embodiments, several measurements of the feedback signal 141 or 181 may be collected and averaged to determine the direction of the bias adjustment, and optionally the size of the bias increment.

The automatic bias control operation described hereinabove may be facilitated if the target set-point for the modulator bias control signal 151 and/or 152, such as the modulator bias voltage Vb, is approximately known, preferably with an accuracy of a small fraction of the modulator $V\pi$. Accordingly, in one embodiment the method may include a step of coarsely determining the target bias set-point Vb0 prior to step 240. This may be accomplished, for example, by varying the DC bias voltage applied at one of the optical phase tuners 123, 124 in a suitably broad range while recording the modulator transmission characteristic, for example by measuring the DC component of the PD current 133, and determining the quadrature set point halfway between minimum and maximum transmission.

In the preceding description the bias voltage Vb may refer to either Vb1 or Vb2, i.e. the DC component of the bias voltage applied to either one of the optical phase tuners 123, 124. In some embodiments both bias voltages Vb1 and Vb2 may be adjusted simultaneously.

Advantageously the bias control method and system of the present disclosure enables to separate the effect of quadrature phase errors $\delta\Phi$ in the modulator from the effect of finite modulator ER, and thus may be suitable for low-ER optical modulators where other bias control methods may fail or suffer a performance degradation. The method also enables to determine, from a single measurement, the direction in which the controller should adjust the modulator bias to converge to the optimal bias set point. Choosing a small step size, and iteratively repeating the steps of dither signal measurement and bias adjustment enables the process to converge to the optimal bias point and to dynamically track the optimum bias when it drifts during the modulator operation. Advantageously, the method enables detecting small deviations of the bias voltage from the optimal bias set-point when the later drifts, as well as the direction of the deviation, and therefore can smoothly adjust the bias voltage to keep the modulator at, or suitably close to, the optimal bias point for low-ER modulators.

The bias control circuitry implementing the method of the present disclosure, such as BCC 180 including the phase-sensitive detector 140 and the controller 150, may be embodied using analog or digital circuitry, or a combination thereof. When embodied in digital circuitry, for example using suitable micro-processors, general purpose processors, programmable logic circuits such as FPGA, or an application specific integrated circuit (ASIC), the BCC 180 may include one or more analog-to-digital converters (ADC) and one or more digital-to-analog converters (DAC), which are not shown in the figure. For example, in one embodiment the phase-sensitive detector 140 may be a lock-in detector embodied using analogue circuitry, with the controller 150 embodied using a suitable digital processor, with an ADC (not shown) in the path of the detected signal 141 and a DAC (not shown) in the path of the bias control signal 151. In embodiments wherein the optical modulator 110 is implemented in a semiconductor chip, the BCC 180 may also be implemented fully or in part in the same semiconductor chip, or may be implemented separately therefrom. In some embodiments, the BCC 180 may be embodied as a separate module that may include one or more dedicated or shared hardware processors or programmable logic circuits. Furthermore, although not shown in FIG. 3, modulator 110 may include other optical elements, including other optical modulators.

Although the method may be applicable to any optical modulator circuit in which two modulated optical signals are combined in quadrature, including a conventional MZ modulator (MZM) with optical phase modulators in its arms, it may be particularly useful for an IQ modulator wherein two optically modulated signals, commonly referred to as the I (in-phase) and Q (quadrature-phase) signals, are combined with π/2 optical phase shift to produce QPSK or QAM modulated light.

Turning now to FIG. 9, there is illustrated an embodiment of the optical modulator 110 that may be used in the modulator device 100 of FIG. 3. In the illustrated embodiment the inner modulators 125, 126 are in the form of MZMs 225 and 226 respectively. Nested MZ modulators of this type may be used as quadrature modulators, also referred to as IQ modulators. The inner MZMs 225, 226 output two modulated optical signals, commonly referred as the I optical signal and the Q optical signal, which are combined in quadrature in the optical combiner 215 to generate a quadrature-modulated optical signal, such as a QPSK or a QAM modulated signal. In the illustrated example embodiment outputs of MZMs 225 and 226 are combined using a 2×2 multi-mode interference (MMI) coupler 215, with the monitoring PD 130 receiving tapped light from an optical tap coupler 213 disposed in the path 211 of the main output light of the modulator and configured to tap off a small fraction of the main modulator light, for example a few percent. In other embodiments the monitoring PD may be coupled to the second optical port of the 2×2 MMI 215. In yet another embodiment the output optical combiner of the modulator may be in the form of a directional coupler 171 with a single output waveguide 116 and a tap coupler 172 as illustrated in FIG. 10. Some embodiments may include other optical components disposed in the path of the output light 102 prior to the optical coupler 172 tapping off the tapped light 103. The IQ modulator illustrated in FIG. 9 may conveniently be embodied using optical waveguides formed in or upon a support substrate 99 of an electro-optic or semiconductor material.

Referring again to FIG. 9, the inner MZMs 225, 226 include signal electrodes 'RF1' and 'RF2', and bias electrodes 231 and 232 respectively. The bias electrodes 231 and 232 are for controlling the operating points of the respective MZMs, typically by applying a suitable bias voltage. In a typical embodiment the inner MZMs 225, 226 may each be biased to operate at a minimum of its respective transfer characteristics, which may require a dedicated bias control loop. Optical phase tuners 123 and 124 are implemented with bias electrodes 233 and 234 respectively, each of which disposed to vary the refractive index and/or the optical path length in a portion of a respective modulator arm 121, 122 of the outer MZI 120. The bias electrodes 233, 234 control the optical phase delays in respective modulator arms 121 and 122. The optical phase shift ΔΦ between the I and Q optical signals in the combiner 215 may be varied using electrical bias signals applied to the bias electrodes 233 and 234, typically but not exclusively in the form of bias voltages Vb1 and Vb2, as described hereinabove with reference to FIGS. 3-7. By tuning a DC component of one or both of the bias control signals 151, 152, the quadrature phase shift ΔΦ may be adjusted in operation in response to a drift in modulator properties, so as to maintain the modulator 110 at the desired set point wherein ΔΦ=π/2.

It will be appreciated that the bias electrodes 231, 232, of the inner MZMs 225, 226 and the bias electrodes 233, 234 of the optical phase tuners 123, 124 may be configured to control the optical phase delays in the respective waveguide arms using different physical mechanisms, including but not limited to electro-optic and thermo-optic effects. Each of the bias electrodes 233, 234 implementing the optical phase tuners 123, 124 may be disposed over or adjacent to the respective waveguide arm of the MZI so as to induce in the waveguide an electrical field, which may change the refractive index in the waveguides due to an electro-optic effect. Although only one bias electrode is shown for each phase tuner, a second matching electrode may also be present to form an electrode pair as known in the art. When the waveguides forming the modulator are implemented in a semiconductor material such as for example silicon, the phase tuners may two bias electrodes with a p/n junction in the waveguide therebetween. In other embodiments bias electrodes may be in the form of, or be electrically connected to, a resistive element disposed close to, or over, the waveguide to control its index of refraction by heating. Accordingly, the shape and positioning of all of the electrodes shown in various figures of the present disclosure are for illustration purposes only, and may differ from implementation to implementation.

Figure 11:
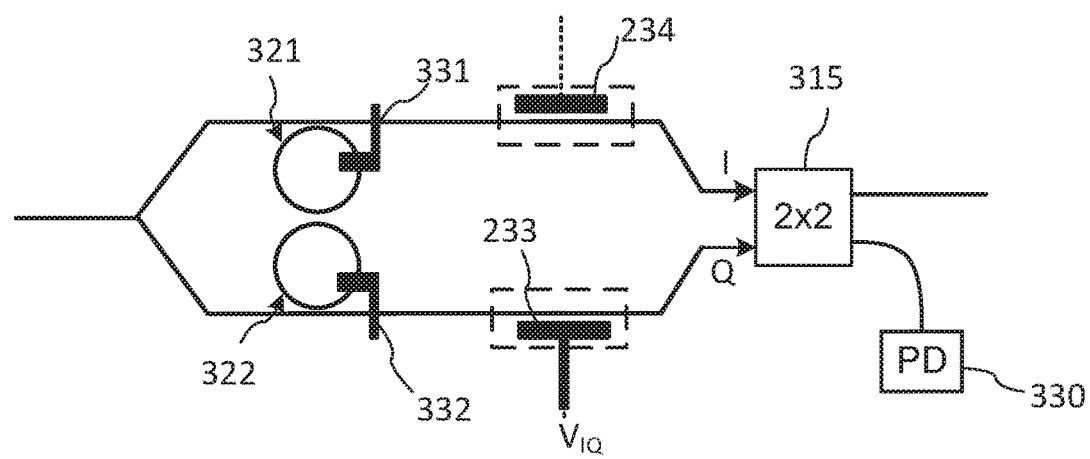
FIG. 11 is a schematic diagram of an embodiment of the optical modulator of FIG. 3 with two inner micro-ring modulators in the modulator arms.

Referring to FIG. 11, in another embodiment the inner modulators producing the I and Q optical signals may also be in the form of micro-ring resonators 321 and 322 optically coupled to the respective modulator arms. Resonant frequencies of these micro-ring resonators, and therefore transmission of light of a particular wavelength in the waveguide arms to which they are coupled, could be modulated using electrodes 331 and 332. Bias electrodes 234, 233 may again be used to control the relative optical phase shift ΔΦ between the modulator arms as described hereinabove.

In each of the embodiments described hereinabove, including those illustrated in FIGS. 3, 9, and 11, both the modulator 110 and the monitoring PD 130 may be supported by the same substrate, wafer, or chip 99. By way of example, the substrate 99 may be a silicon-on-insulator (SOI) substrate and the PD 130 may be a p/n junction photo diode formed in the SOI substrate 99. In another embodiment, the substrate 99 may be a substrate, wafer, or chip of another suitable semiconductor material as known in the art, such as for example GaAs-based or InP-based, with the PD 130 formed therein. In another embodiment, the PD 130 may be mounted in a recess in the substrate 99. The PD 130 may also be a separate element optically coupled to the OMC 110, for example using suitable coupling optics and/or optical fiber.

In addition to controlling the optical IQ phase shift in the outer MZI at its quadrature set point, optical IP modulators such as that shown in FIG. 9 may require additional bias control loops to maintain the bias of the inner MZMs 225 and 226 at their target setting. In at least some implementations the target bias set point of the inner MZMs may be at a minimum in their transfer characteristic, which corresponds to a π rad relative optical phase shift between their two arms. Various methods could be used to control the operating set point of an MZM at a minimum transmission point, including applying distinct dither signals to each of the bias electrodes of the inner MZMs and controlling the DC components of the respective bias signals so as to suppress these distinct dither frequencies in the electrical signal from a monitoring PD. Examples of such bias control loops have been disclosed in a U.S. patent application Ser. No. 15/459,066, which is incorporated herein by reference; these and other bias control techniques can be continently combined with the difference-frequency method for controlling the optical phase shift of the outer MZI that is described hereinabove.

Figure 12:
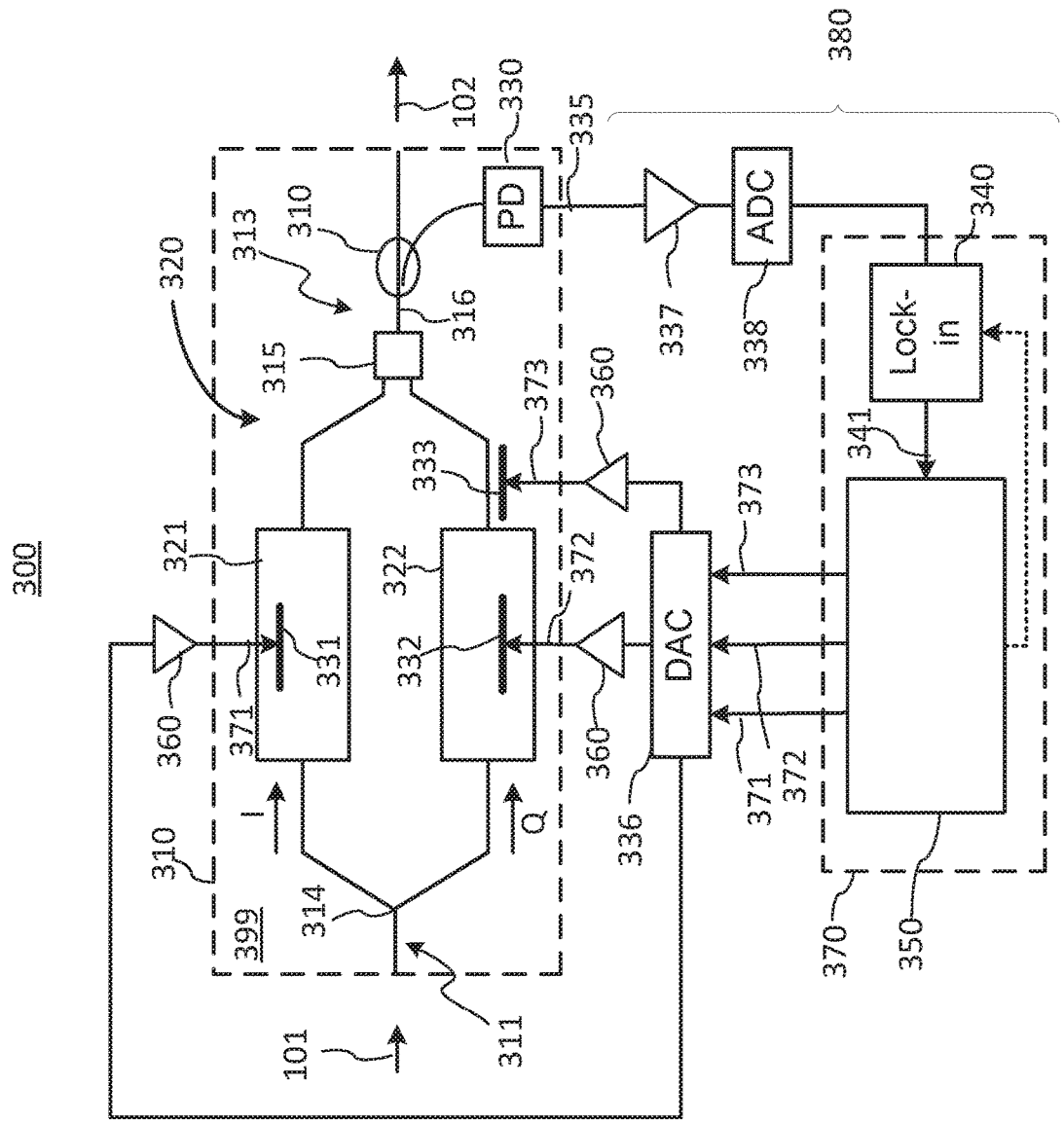
FIG. 12 is a schematic diagram of a modulator apparatus including an optical quadrature IQ modulator circuit and a multi-functional bias control circuit that incorporates a lock-in dither detector and implements the method of FIG. 1 to control for the quadrature phase shift.

Referring now to FIG. 12, there is schematically illustrated an optical modulating circuit (OMC) 310 wherein first and second optical modulators 321, 322 are optically connected in parallel using an input optical splitter 314 and an output optical combiner 315, so as to form an outer Mach-Zehnder interferometer (MZI) 320 connecting an input port 311 to an output port 313. The optical modulators 321, 322 may also be referred to herein as the first and second inner optical modulators, respectively. Similarly to the modulator 110 of FIG. 3, the OMC 310 may be implemented, for example, with optical waveguides formed in or upon a substrate 399 of a suitable electro-optic material, such as but not exclusively a SOI substrate or wafer. Each of the input optical splitter 314 and the output optical combiner 316 may be embodied using any waveguide strictures commonly known to provide the respective functionalities, such as, for example, with a directional waveguide coupler or with a 2×2 multi-mode interference (MMI) coupler. In operation, input light 101 that enters the OMC 310 from an input port 311 is first split by the optical splitter 314 in two light portions that pass through the respective optical modulators 321, 322 and are recombined by the optical combiner 315 to leave the OMC 310 by means of a main output waveguide 316 of the output optical port 313. A monitoring PD 330 is optically coupled to the OMC 310 to receive light tapped from the output of the optical combiner 315, for example using an optical tap coupler 310 disposed after the optical combiner 315. In embodiments wherein the output combiner 315 has two or more output ports, such as for example a 2×2 MMI coupler, the monitoring PD 330 may be coupled to a second, auxiliary, output port of the optical combiner (not shown in FIG. 12).

The optical modulators 321, 322 may be each implemented as MZMs as illustrated in FIG. 9. Each of them includes a bias electrode, schematically illustrated in FIG. 12 at 331 and 332, which is configured for controlling a set point of the respective optical modulator by adjusting a relative optical phase delay in the modulator. A third bias electrode 333 is disposed to control the phase of light propagating in one of the waveguide arms of the outer MZI outside of the inner modulators 321, 322. The third bias electrode 333 may be disposed in either of the two arms of the outer MZI either before or after the corresponding inner MZM.

In operation, the set point of the first inner modulator 321 is controlled by a first bias control signal 371, which may be provided to the first bias electrode 331 in the form of a first bias voltage Vb1. The set point of the second optical modulator 322 is controlled by a second bias control signal 372, which may be provided to the second bias electrode 332 in the form of a second bias voltage Vb2. The first and second inner MZMs 321, 322 may be controlled so as to operate at a minimum of their respective transfer characteristic in the absence of a data signal.

OMC 310 may be configured to implement a quadrature IQ modulator in which the two light portions that pass through the inner modulators 321, 322 are combined by the combiner 315 in quadrature, i.e. with a target value of the relative optical phase shift $\Delta\Phi$ equal to $\pi/2$ rad. In this embodiment the optical signals generated by the two inner MZMs 321, 322 may be referred to as the I and Q optical signals, and the respective MZMs 321, 322 as the I and Q modulators. The relative optical phase shift $\Delta\Phi$ between the I and Q optical signals in the combined light 102 may be referred to as the IQ phase shift and denoted $\phi_{IQ}$. The IQ phase shift $\phi_{IQ}$ between the I and Q optical signals in the outer MZI may be controlled by a third bias control signal 373 which may be applied to the third bias electrode 333 in the form of a third bias voltage Vb3. All three bias control signals 371-373 may originate from a same bias controller 350.

An electrical bias control circuit (BCC) 380 of the OMC 310 includes bias controller 350 that connects to the bias electrodes 331-333 of the OMC 310 and generates the bias control signals 371-373. The bias control circuit 380 further includes a phase-sensitive dither detector 340 that receives a PD signal 335 from the PD 330 and provides its output signal or signals to the controller 350 as a feedback for tuning the bias settings of the OMC 310. The BCC 380 and the controller 350 may be configured to implement each of the functionalities of the BCC 180 and the controller 150 for maintaining the quadrature optical phase shift $\Delta\Phi$ of the outer MZI as described hereinabove with reference to FIGS. 3-7, so that the description of possible embodiments, features, and functionalities of the BCC 180 and the controller 150 may apply mutatis mutandis to the BCC 380 and controller 350. However, in the embodiment of FIG. 12 the dither signals are applied to the bias electrodes of the inner modulators 321, 322 while the DC bias signal that controls the quadrature phase shift of the modulator is applied to the bias electrode 333 outside of the inner MZMs.

Controller 350 may be configured to generate the first bias control signal 371 having a first DC bias component $S_{DC1}$ that defines a bias set-point of the first optical modulator 321, the second bias control signal 372 $S_2$ having a second DC bias component $S_{DC1}$ that defines a bias set-point of the second optical modulator 322, and the third bias control signal 373 $S_3$ having a third DC bias component $S_{DC3}$ defining a bias set-point of the outer MZI 310. The DC components of the first, second, and third bias control signals 371, 372, and 373 may also be referred to herein as the first, second, and third DC bias signals, respectively. In operation each of these signals may be individually tuned by the controller 350 as needed to track changes in the target bias set-point of the first and second optical modulator and the target set-point of the outer MZI.

Controller 350 may be further configured to include one or more functional modules that implement one or more steps of a bias control method of the current disclosure as described hereinabove with reference to FIGS. 1, 4-7. In the illustrated embodiment both the bias controller 350 and the phase-sensitive detector 340 are implemented with digital electronics, for example with a single dedicated or shared digital hardware processor 370, or with two or more shared or dedicated hardware processors. Accordingly, the bias control circuit 380 includes an ADC 338 that converts the electrical PD signal 335 into a digital signal, and a multi-channel DAC to convert the bias control signals 371, 372, 373 generated by the controller 370 from the digital to electrical domain. From the DAC 336, each of the bias control signals 371-373 may be provided to a respective bias electrode 331, 332, or 333 in the form of a bias voltage Vb1, Vb2, or Vb3 by means of a respective bias driver 360. The electrical circuit connecting the PD 330 to the phase-sensitive dither detector 340, which may be in the form of a lock-in detector, may include a trans-impedance amplifier (TIA) 337 preceding the ADC 338. It will be appreciated that all or some of the functional modules that are shown in FIG. 12 to be implemented digitally, such as for example dither generators and/or the lock-in detector 340, may also be implemented at least in part using analogue electronic circuits.

The bias controller 350 may be configured to adjust the DC bias components of the bias control signals 371-373 responsive to an output signal or signals 341 from the lock-in detector 340, which detection phase may be controlled by a reference or clock signal or signals from the controller 350. The bias controller 350 may also add periodic dither signals at two distinct frequencies $f_1$ and $f_2$ to the bias control signals 371, 372 and use these dither signals to control the bias settings of the two inner MZMs and also of the IQ phase shift $\phi_{IQ}$ in the outer MZI.

In some embodiments controller 350 may be configured to perform also the bias control of the inner modulators 321, 322 and the IQ phase shift in the outer MZI using the same two distinct dither frequencies $f_1$ and $f_2$ but different time slots. For example, in one embodiment bias controller 150 may apply, in a first time slot, a first dither tone at the first dither frequency $f_1$ to the bias electrode 331 of the first MZM 321, detect a signature of this dither signal at the first dither frequency $f_1$ in the electrical PD signal using the lock-in detector 340, and use information in the output lock-in signal or signals 341 to adjust the first bias voltage Vb1. Bias controller 150 may further apply, in the same or different time slot, a second dither tone at the second dither frequency $f_2 \ne f_1$ to the bias electrode 332 of the first MZI 321, detect a signature of this dither signal at the second dither frequency $f_2$ in the electrical PD signal 335 using the lock-in detector 340, and use information in the output lock-in signal or signals 341 regarding that signature to adjust the second bias voltage Vb2. In both cases the respective bias voltage is adjusted so as to decrease a magnitude of the detected dither signal, and the use of the lock-in detector enables obtaining slope information that is indicative to in which direction the respective bias signal has to be adjusted from a single lock-in measurement, as described in further detail in U.S. patent application Ser. No. 15/459,066.

In another time slot, bias controller 150 may apply dither signals at the first and second dither frequencies $f_1$ and $f_2$ to each of the first and second bias electrodes 331, 332 so as to cause two single-sideband modulations in the combined light 102 at opposite sides of the optical carrier $f_{opt}$, and then measure the dither signal at the difference frequency f12 to determine what adjustment is needed to the IQ phase shift as described hereinabove with reference to FIGS. 1-7. For example controller 350 may add, at the same time, a first periodic dither signal $S_1(f_1)$ at the first dither frequency $f_1$ and a second periodic dither signal $S_2(f_2)$ at the second dither frequency to the first bias control signal 371. Simultaneously, controller 150 may add a third periodic dither signal $S_3(f_1)$ at the first dither frequency $f_1$ and a fourth periodic dither signal $S_4(f_2)$ at the second dither frequency $f_2$ to the second bias control signal, wherein the third dither signal $S_3(f_1)$ is shifted in phase with respect to the first dither signal $S_1(f_1)$ by $\pi/2$, and the fourth dither signal $S_4(f_2)$ is shifted in phase with respect to the second dither signal $S_2(f_2)$ by minus $\pi/2$. For example in one embodiment $S_1$ may vary in time as $\sin(f_1 \cdot t)$, $S_2$ may vary in time as $\sin(f_2 \cdot t)$, $S_3$ may vary in time as $\sin(f_1 \cdot t + \pi/2) = \cos(f_1 \cdot t)$, and $S_4$ may vary in time as $\sin(f_2 \cdot t - \pi/2) = -\cos(f_2 \cdot t)$. The amplitudes of these dither signals may be such so as to result in an asymmetrical cancellation of dither frequency sub-bands at opposite sides of the optical spectrum for the two dither frequencies $f_1$ and $f_2$ when $\phi_{IQ} = \pi/2$, as described hereinabove. In a preferred embodiment wherein the optical splitter 314 and the two modulator arms of the MZI are power balanced, the pairs of dither functions of the same dither frequency $S_1$, $S_3$ and $S_2$, $S_4$ should be of the same magnitude. The third bias signal 373, and the corresponding bias voltage Vb3, is then adjusted so as to reduce the magnitude of a selected phase component of a dither oscillation at the difference frequency $f_{12} = |f_2 - f_2|$, as described hereinabove with reference to FIGS. 1-7.

In an example embodiment the first dither signals $S_1(f_1)$ and the third dither signals $S_3(f_1)$ may vary in time according to a same first periodic waveform $A_1(f_1 \cdot t)$ but with a quarter-period phase shift therebetween, while the second dither signals $S_2(f_2)$ and the fourth dither signals $S_4(f_2)$ may vary in time according to a same second periodic waveform $A_2(f_2 \cdot t)$ but with a quarter-period phase shift therebetween of the opposite sign:

$$S_1(f_1) = A_1(f_1 \cdot t);$$
$$S_3(f_1) = A_1\left(f_1 \cdot \left(t + \frac{T_1}{4}\right)\right);$$
$$S_2(f_2) = A_2(f_2 \cdot t)$$
$$S_4(f_2) = A_2\left(f_2 \cdot \left(t - \frac{T_2}{4}\right)\right)$$

where $T_1 = 1/f_1$ and $T_2 = 1/f_2$ are the first and second dither periods corresponding to the first and second dither frequencies respectively.

In one embodiment the first and second waveforms $A_1(\ )$, $A_2(\ )$ may be substantially a same periodic waveform but of the two different frequencies. In one embodiment these waveforms may be each in the form of a dither tone at one of the two distinct frequencies $f_1$ and $f_2$. For example in one embodiment the following relationships may hold: $S_1 = a_1 \cdot \sin(f_1 \cdot t)$, $S_2 = a_2 \cdot \sin(f_2 \cdot t)$, $S_3 = a_1 \cdot \sin(f_1 \cdot t + \pi/2) = a_1 \cdot \cos(f_1 \cdot t)$, and $S_4 = a_2 \cdot \sin(f_2 \cdot t - \pi/2) = -a_2 \cdot \cos(f_2 \cdot t)$.

The dither frequencies $f_1$ and $f_2$ may be selected to be relatively low, typically much smaller than the data rate of the modulator device 300; for example, both of these dither frequencies may lie in a kilohertz range, but are not limited thereto.

The two dither frequencies $f_1$ and $f_2$ differ from each other and, preferably, neither of them is a harmonic of the other. In one embodiment, the first and second dither frequencies $f_1$ and $f_2$ may be selected so that their respective periods $T_1 = 1/f_1$ and $T_2 = 1/f_2$ are each equal to a multiple of a clock period $T_{cl}$ of a digital processor implementing one or both of the bias controller 350 and the lock-in detector 340. In such embodiment the lock-in detector 340 could use an integration cycle that is equal to an integer number of each of the two dither periods $T_1$ and $T_2$ to avoid distortions. By way of example, the signal sampling or clock frequency $f_{cl}$ is 25 kHz, $f_1 = 5.625$ kHz, $f_2 = 3.125$ kHz, and $f_{12} = 2.5$ kHz. If the integration time of the lock-in detector is 40 samples, then the 2.5 kHz frequency-difference tone is sampled 4 cycles, the 3.125 kHz tone is sampled 5 cycles and the 5.625 kHz tone is sampled over 9 cycles. Hence, the three tones at $f_1$, $f_2$ and $f_{12}$ may be aligned so that after each 40 samples they all return to a same phase, for example may all reach 'zero', thereby avoiding integration errors.

Figure 13:
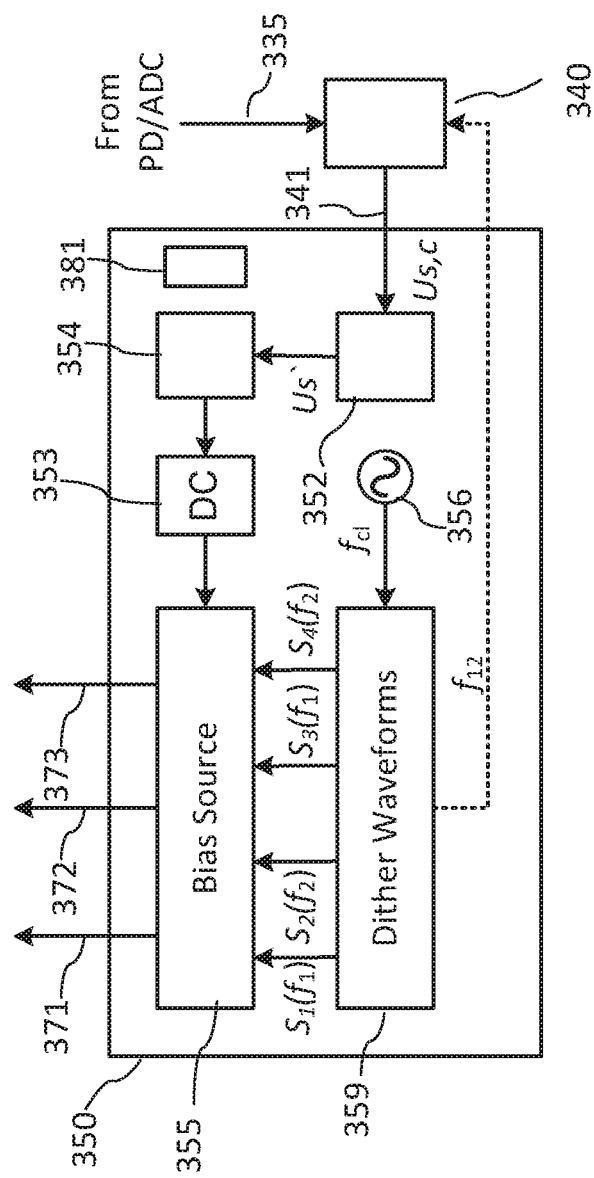
FIG. 13 is a schematic functional diagram of one embodiment of a bias controller of the modulator apparatus of FIG. 12.

Referring to FIG. 13, in one embodiment bias controller 350 may be configured, for example programmed, to implement a dither waveform logic 359, a DC bias source 353, a bias signal source 355, a bias control logic 354, and an optional feedback signal processing logic 352. Memory 381 may further be provided to store feedback sensitivity or slope information for the feedback signals used in controlling the bias settings of the inner MZMs and the IQ phase shift of the modulator 310. The bias signal source 353 generates the DC components of the bias control signals 371-373, which values are responsive to control signals from the bias control logic 354. When controller 350 operates in an IQ phase control mode, the dither waveform logic 359 may generate the dither signals $S_1(f_1)$ and $S_2(f_2)$ at the two dither frequencies together with their phase-shifted versions $S_3(f_1)$ and $S_4(f_2)$, and provide these signals to the bias signal source 355, which combines them with the DC components of the first and second bias signals 371, 372 as described hereinabove. When controller 350 operates in a control mode where it controls the bias setting of one the I and Q modulators, the dither waveform logic 359 may generate only the first and second dither signals $S_1(f_1)$ and $S_2(f_2)$, which are then added individually to the first and second bias signals 371, 372 so as to apply different dither frequencies to the I and Q modulators.

Figure 14:
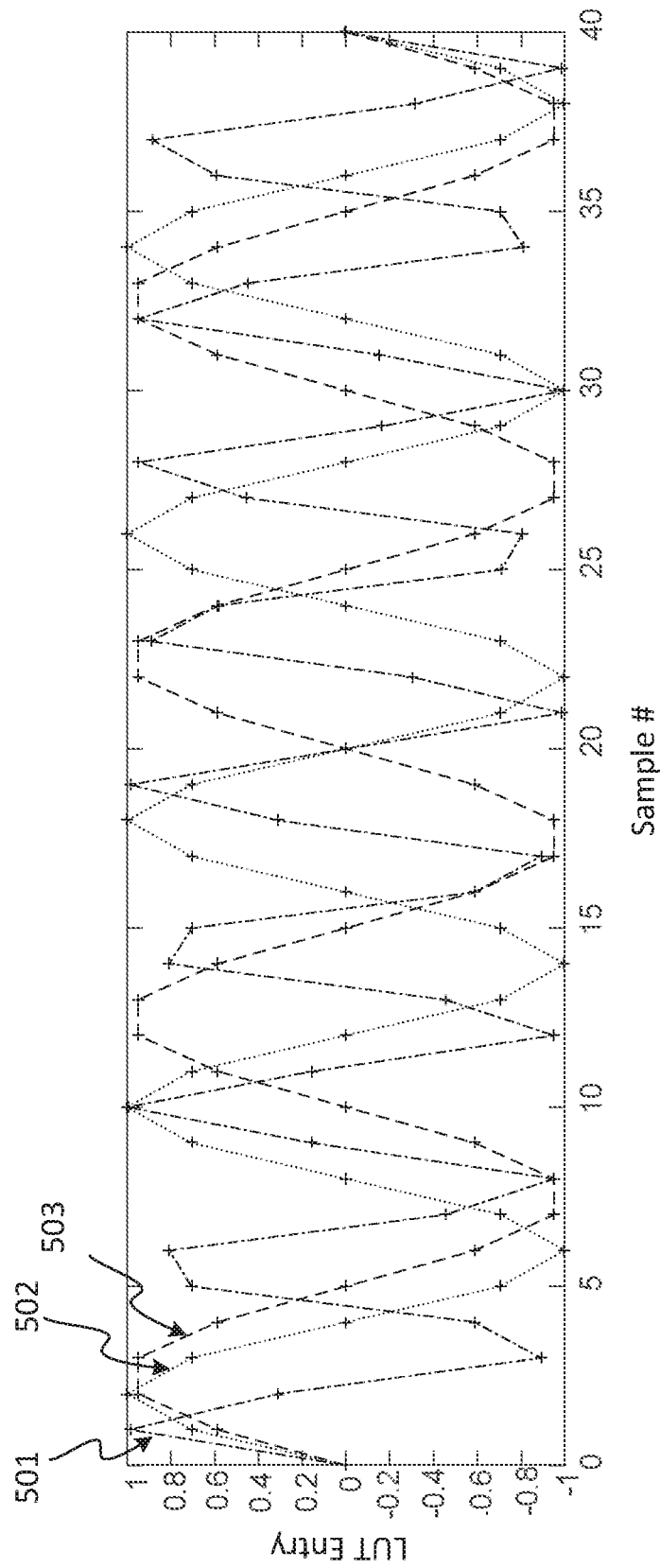
FIG. 14 is a graph illustrating sine waveforms at the first dither frequency $f_1$, the second dither frequency $f_2$, and the difference frequency $f_{12}$ that may be saved in a look-up table and used to generate half of the dither functions and reference signals used in controlling the IQ phase shift.

Referring now also to FIG. 14, in one embodiment the dither waveform logic 359 may store the waveforms $A_1(f_1t)$ 501 and $A_2(f_2t)$ 502 corresponding to the first and second dither signals $S_1(f_1)$ and $S_2(f_2)$ in a look-up table (LUT). The first and second dither frequencies $f_1$ and $f_2$ are selected so that their respective periods $T_1=1/f_1$ and $T_2=1/f_2$ are each equal to a multiple of a clock period $T_{cl}$, i.e $T_1=m\sim T_{cl}$ and $T_2=n\sim T_{cl}$, where n and m are different integers; by way of example n>m>1. The LUT also stores a frequency difference waveform 503 corresponding to a reference signal at the difference frequency $f_{12}=(f_1-f_2)$. Each of the waveforms is stored as a sequence of waveform samples with a same sampling period $T_{cl}$. The length of each of the stored waveforms corresponds to a same time interval $T=m \cdot n \cdot T_{cl}$. Thus the LUT stores an integer number of periods of each of the waveforms. All three waveforms are aligned in the LUT so as to have a same phase at the first samples.

In the illustrated example, each of the stored waveforms is a sine wave with the dither frequency of the first waveform 501 $f_1=5.625$ kHz, the dither frequency of the second waveform 502 $f_2=3.125$ kHz, the frequency of the reference waveform 503 $f_{12}=2.5$ kHz, with the sampling frequency $f_{cl}=25$ kHz, and the LUT stores 40 samples. FIG. 14 shows clock samples numbered from 0 to 40, i.e. 41 clock samples, with the last clock sample shown in order to illustrate that all three waveforms converge to the same value at the end of the LUT.

The dither waveform logic 359 may then be configured to step through the entries in the LUT with the clock frequency $f_{cl}$ to generate the first and second dither signals $S_1$, $S_2$ at the first and second dither frequencies $f_1$ and $f_2$, and simultaneously generate the sine-wave reference tone at the difference frequency $f_{12}$ that is synchronized, i.e. is periodically in-phase, with the first and second dither signals. The phase-shifted dither signals $S_3$, $S_4$ may be generated using a similar LUT, or additional entries in the same LUT, which for example may store the cosine waveforms at the dither frequencies $f_1$ and $f_2$ and the difference frequency $f_{12}$ that are phase-synchronized at the first samples.

The dither signals $S_1$ and $S_2$ at the first and second dither frequencies and the corresponding phase-shifted dither signals $S_3$ and $S_4$ generated this way may be provided to the bias signal source 355 to be added to the corresponding bias control signal during the IQ phase control mode of the operation.

The reference signal generated using the LUT example of FIG. 14 may be provided to the lock-in detector 340 to generate the sine lock-in signal Us. Similarly, the LUT entries for the cosine waveform at the difference frequency $f_{12}$ may be used by the lock-in 340 to generate the cosine lock-in signal Uc. The generation of the dither frequencies $f_1$ and $f_2$ and the difference frequency $f_{12}$ from a same LUT allows for a fixed phase relationship between the dither signals and the difference-frequency reference signal at the lock-in detector. For the dither signals in the kHz range, additional phase delays in the paths of the difference-frequency reference signal and of the dither signals at the dither frequencies $f_1$ and $f_2$ from the dither generating logic 359 to the lock-in detector 340 may be made relatively small. In that case one of the lock-in signals Us and Uc may be linearly dependent on the IQ phase error $\delta\phi_{IQ}=(\phi_{IQ}-pi/2)$, crossing zero for $\phi_{IQ}=pi/2$, or when the third bias voltage Vb3 is equal to its target setting $Vb3_0$. Therefore in some embodiments one of the lock-in signals Us and Uc may be directly used by the bias control logic 354 as the error signal when controlling the IQ phase.

In other embodiments there may be a phase delay at the lock-in detector 340 between the reference signal and the detected dither signal at the difference frequency $f_{12}$, resulting in non-optimal detection phase θ at the lock-in. This phase delay may be measured or calibrated against as described hereinabove, for example by first determining a rotation angle θr for the lock-in output (Us, Uc) for which one of the rotated lock-in signals Us' and Uc' is independent on the bias, for example Uc'. This rotation angle θr, or the corresponding rotation matrix, may be saved in memory 381 and used by the processing logic 352 to obtain from the lock-in output (Us, Uc) the rotated signal Us' that is sensitive to the bias setting and can be used as an error signal for the bias control logic 354, as described hereinabove. In other embodiments a tunable delay line in the path of the reference signal may be used at calibration to compensate for the phase delay θ. In any of these embodiments, memory 381 may store a slope parameter s, which characterizes the rate of change of the corresponding lock-in signal, or the error signal obtain therefrom, with the deviation of the bias signal Vb3 from its optimal setting. In some embodiment only the sign of the slope s may be saved. The slope information is used by the bias control logic 354 to determine the direction in which the bias voltage Vb3 is to be adjusted.

When performing the bias control of the inner modulators 321, 322, the dither generating logic 359 may output only the first dither signal $S_1$ at the first dither frequency $f_1$ and/or the second dither signal at the second dither frequency $f_2$, which are then provided to the bias electrodes of the corresponding inner modulators 321 and/or 322 so as to dither each of their respective bias settings at a distinct dither frequency, $f_1$ or $f_2$. Simultaneously a copy or copies of the corresponding dither signal(s) at the first and/or second dither frequency can be provided to the lock-in detector 340 for detecting oscillations at one or both of the respective dither frequencies in the PD signal, which output may then be used by the controller 350 to adjust the corresponding bias voltages Vb1 and/or Vb2, possibly using respective slope information stored in memory 381, for example as described in U.S. patent application Ser. No. 15/459,066. Using different dither frequencies to control the I and Q modulators 321, 322 enables controlling their bias settings in parallel using two different frequency channels. In other embodiments the bias settings of the I and Q modulators 321, 322 may be controlled in different time slots using only a single dither frequency at a time.

In one embodiment, the process of bias control for the OMC 310 may include an initial coarse-tuning stage and a fine-tuning stage. During the initial coarse-tuning stage each of the three DC bias signals $S_{DC1}$, $S_{DC2}$, and $S_{DC3}$ of the OMC 310 are brought suitably close to their target set points. At the fine-tuning stage the respective bias signals are further optimized and/or dynamically adjusted to track any drift in the target bias set points that may occur during the device operation.

The initial coarse-tuning stage may be performed using a variety of bias optimization algorithms. It may include, for example, launching input light 102 into the input port 311, and the controller 350 recoding the PD signal 335 while keeping two of the three DC bias signals $S_{DC1}$, $S_{DC2}$, and $S_{DC3}$ and scanning the remaining DC bias signal, so as to determine an optimal value thereof. The PD signal 335 may be provided to the controller 350 at this stage bypassing the lock-in detector 340 as an indication of the optical power from the modulator to record the transmission. This process may then be repeated iteratively varying each of the DC bias signals to coarsely determine the target set-point values of all three DC bias signals $S_{DC1}$, $S_{DC2}$, and $S_{DC3}$. In one embodiment, the fixed bias signals may be optimized for maximum transmission of the OMC during the scans.

By way of example, the controller 350 may first fix Vb2 and Vb3 at trial values thereof, and vary the first bias voltage Vb1 of the first modulator 321 to determine its interim optimal value. The controller 350 may than look for an interim optimal value for Vb2 by setting Vb1 to its found interim optimal value, and varying Vb2 while keeping Vb1 and Vb3 fixed. Finally, an interim optimal value for Vb3 may be found by keeping Vb1 and Vb2 to their respective interim optimal values, and varying Vb3. These steps may then be iteratively repeated to arrive at the initial coarse settings of each of the DC bias signals $S_{DC1}$, $S_{DC2}$, and $S_{DC3}$ and the corresponding bias voltages Vb1, Vb2, and Vb3.

Once the target settings of the bias control signals 371, 372, and 373 of the OMC 310 are coarsely identified, the bias control signals or voltages of the inner modulators 321 and 322 may be further optimized, and/or dynamically controlled to stay at their respective target set-points, substantially as described hereinabove with reference to method 10 and FIGS. 3-14.

It will be appreciated that the bias control technique described hereinabove with reference to the optical modulators 110 and 310 by way of example may also be applicable to other optical modulating circuits including any number of waveguide optical modulators and any number of phase tuners to be controlled, using one or more suitably placed monitoring photodetectors followed by one or more phase-sensitive dither detectors, such as single-channel or multi-channel lock-in detectors.

Figure 15:
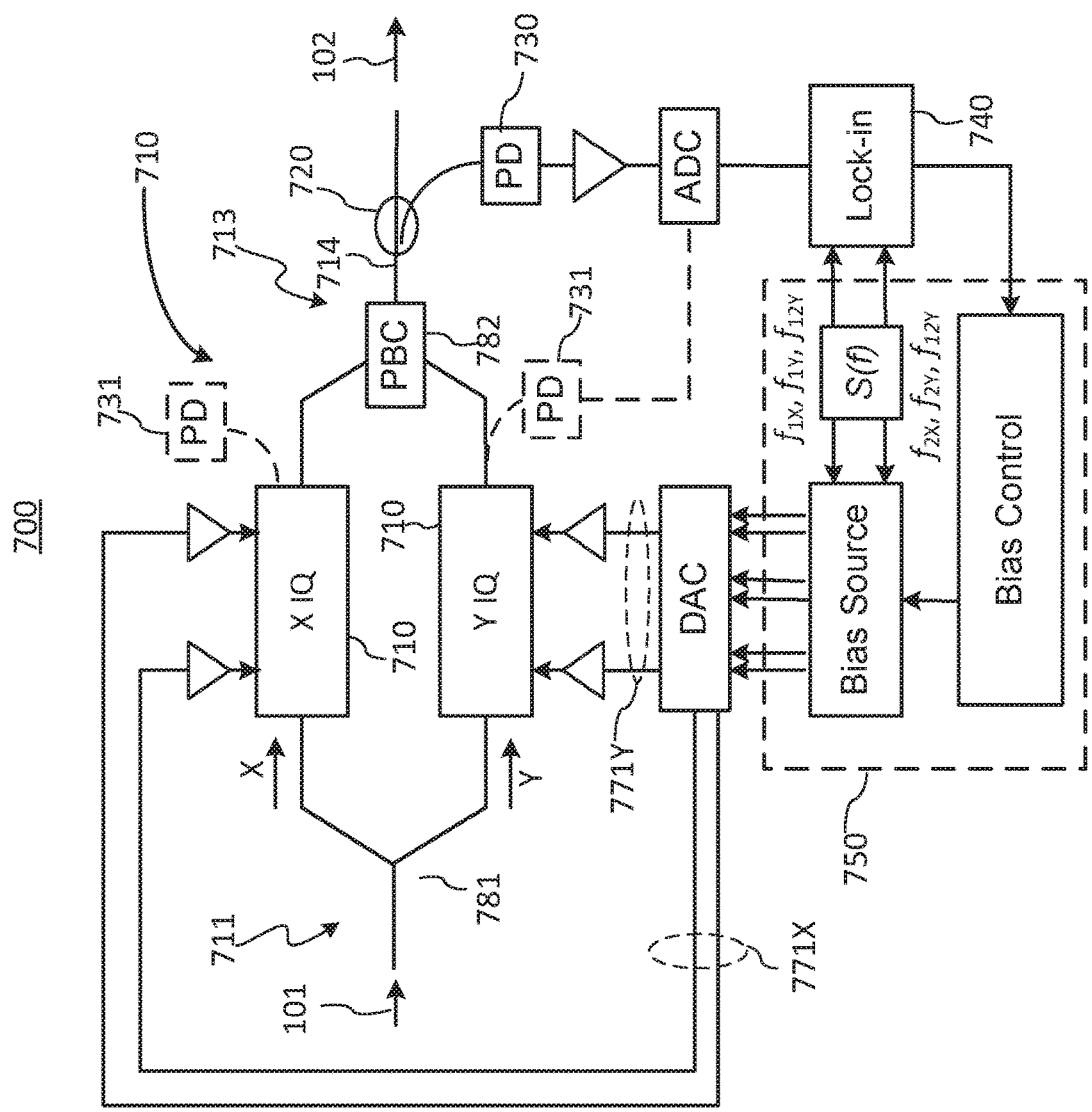
FIG. 15 is a schematic diagram of a modulator apparatus including a dual-polarization optical IQ modulator circuit and a multi-channel bias control circuit that incorporates a lock-in dither detector.

Referring to FIG. 15, there is illustrated an optical modulator apparatus 700 including an optical modulating circuit 710 in the form of a dual-polarization (DP) IQ modulator formed with two single-polarization optical modulators 710 connected in parallel between an input port 711 including a beam splitter 781, and an output port 713 including a polarization beam combiner (PBC) 782 that incorporates a polarization rotator at one of its two inputs. In operation suitably polarized input light 101 is split by beam splitter 781 into two light beams of preferably equal power, which are conventionally denoted as 'X' and 'Y' and have orthogonal polarizations at the output of the apparatus 700. Light having the X polarization at the output is directed to pass through one of the two modulators 710, which may be referred to as the X modulator, and light having the Y polarization at the output is directed to pass through the other of the two modulators 710, which may be referred to as the Y modulator. Each of the X and Y optical modulators 710 may be embodied as the OMC 310 illustrated in FIG. 12, with the bias settings of the X modulator 710 being controlled by three bias controlled signals 771X and the bias settings of the Y modulator 710 being controlled by three bias controlled signals 771Y, each generally as described hereinabove with reference to FIG. 12.

Accordingly, in one embodiment the modulator device 700 may include two monitoring photodiodes 731, each of which disposed to receive light tapped from an output of the respective IQ modulator 710, with their respective biases independently controlled by two electrical feedback circuits (not shown), each of which may be implemented as described hereinabove with reference to FIGS. 1-14. The two electrical feedback circuits separately controlling the bias settings of each of the IQ modulators 710 may be implemented using a shared hardware processor or two or more separate hardware processors. In this embodiment, the electrical bias control circuits for each of the IQ modulators 710 may utilize the same two dither frequencies f1 and f2, or two different pairs of dither frequencies.

In the embodiment illustrated in FIG. 15, the bias signals 771X, 771Y of the OMC 710 may be controlled using a single monitoring PD 730 that is optically coupled at the output port 713 to receive light tapped from an output of the PBC 782, for example using a tap coupler 720. In this embodiment, a single bias control circuit that includes a multi-channel lock-in detector 740 and a controller 750 may be used to set, and dynamically tune, each of the bias control signals 771X, 771Y that control respective bias settings of the two IQ modulators 710. The lock-in detector 740 and the controller 750 may substantially combine functionalities of two lock-in detectors 340 and two controllers 350 of the bias control circuit 380 of the OMC 310 of FIG. 3, each of them operating generally as described hereinabove, with the lock-in detector 740 receiving its input from the PD 730, detecting respective dither tones in the received PD signal in a manner sensitive to the phase of the detected dither trace, and providing corresponding feedback signals in each channel to the controller 750, which in response may generate and/or adjusts the bias control signals 771X and 771Y. In this embodiment, the controller 750 may use two different pairs of dither frequencies, denoted in FIG. 7 as $f_{1X}$, $f_{2X}$ and $f_{1Y}$, $f_{2Y}$, to separately control the bias settings of the two IQ modulators 710, with all four dither frequencies being different and $|(f_{1X}-f_{2X})| \neq |(f_{1Y}-f_{2Y})|$ in order to enable separated detection of the dither frequencies and their differences in the electrical signal from the PD 730 by the lock-in detector 740. In another embodiment $f_{1X}=f_{1Y}$, $f_{2X}=f_{2Y}$, and the bias control of the X and Y modulators 710 may be performed in different time slots.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, in some embodiments of the OMC 310 of FIG. 12 additional monitoring PDs may be provided to directly monitor the optical transmission of each of the inner modulator 321, 322. These additional monitoring PDs (not shown) may be placed after a tap coupler directly after each of the inner modulators 321, 322 in their data paths, or on a drop port of the optical combiner of each of the inner MZMs. Furthermore, the monitoring PD 330 may be placed after the outer combiner 315 in the data path 316, or on a drop port of the outer combiner 315. Using two monitoring PDs disposed to receive light directly from the outputs of the inner modulators 321, 322, the bias signals 371, 372 of these modulators may be simultaneously scanned to determine their optimal settings. In embodiments where the drop port of an optical combiner is used for bias monitoring, a non-ideality of the combiner's phase response may potentially lead to a less accurate bias optimization, as the dither signal may disappear at different bias voltages in the main and drop ports of the combiner.

Furthermore, the bias electrodes that implement phase tuners in each of the example embodiments described hereinabove may be configured in a variety of ways, and may be non-contiguous, i.e. including two or more separate electrode segments. In embodiments where a bias electrode implementing a phase tuner includes two separate segments, the DC component of the bias control signal and the corresponding dither signal may be applied to different segments of the bias electrode.

Furthermore, in some embodiments the dither signals may be used to modulate not only phase but also, or exclusively, intensity of the corresponding light signals. Accordingly, in some embodiments the dither signals may be applied to intensity modulators that may be incorporated in some of the waveguide arms of the modulator, for example in the form of a forward-biased p/n junction.

Furthermore, the dither signals $S_1(f_1)$, $S_2(f_2)$, $S_3(f_1)$, and $S_4(f_2)$ may have other periodic waveforms, which should be however matched pair-wise so as to enable the cancellation of at least some of the respective sub-bands at one side of the optical spectrum when their respective carriers are combined with the target quadrature phase shift $\Delta\Phi=\pi/2$. For example, the dither functions $S_1(f_1)$, $S_3(f_1)$ may each be in the form of a square waveform with a quarter period phase shift therebetween, while the dither functions $S_2(f_2)$, $S_4(f_2)$ may each be a same square waveform or any other periodic waveform with a quarter period phase shift therebetween of the opposite sign. The effect of higher-order sub-bands may be effectively filtered out by the lock-in detector that is tuned to detect only the difference frequency $f_{12}$ of the first harmonics.

Furthermore, it will be appreciated that different electro-optic dielectric materials and semiconductor materials other than silicon, including but not limited to compound semiconductor materials, such as GaAs, InP, and their alloys and compounds, may be used to fabricate the optical modulator circuits example embodiments of which are described hereinabove. In another example, although example embodiments described hereinabove may have been described primarily with reference to an MZM modulator and a nested quadrature modulator, it will be appreciated that principles and device configurations described hereinabove with reference to specific examples may be adopted to perform an automatic bias control of optical waveguide modulators of other types, including single-sideband optical modulators.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical modulator apparatus comprising:
   an optical modulator circuit comprising:
      an input optical port for receiving input light;
      an output optical port configured to provide output modulator light and tapped light;
      first and second modulator arms each optically connecting the output optical port to the input optical port; and,
      a plurality of electrodes comprising a first bias electrode coupled to the first modulator arm and a second bias electrode coupled to the second modulator arm, the plurality of electrodes configured to adjust, responsive to a bias signal, optical phase of light propagating in one of the first and second modulator arms relative to the other of the first and second modulator arms, and to separately modulate light propagating in the first and second modulator arms with one or more dither signals;
   a monitor photodiode (PD) disposed to receive the tapped light and to output a PD signal responsive thereto;
   a controller operatively coupled to the plurality of bias electrodes and configured to:
      provide to the first bias electrode a first dither signal $S_1$ oscillating at a first dither frequency $f_1$ and a second dither signal $S_2$ oscillating at a second dither frequency $f_2 \neq f_1$;
      provide to the second bias electrode a third dither signal $S_3$ oscillating at the first dither frequency $f_1$ and a fourth dither signal $S_4$ oscillating at the second dither frequency $f_2$, wherein the third dither signal $S_3$ is shifted in phase with respect to the first dither signal by 90 degrees, and the fourth dither signal $S_4$ is shifted in phase with respect to the second dither signal by (−90) degrees; and,
      provide the bias signal to at least one of the plurality of bias electrodes;
   a phase-sensitive dither detector disposed to receive the PD signal and configured to detect therein a dither signal at a difference frequency $f_{12}=|f_1-f_2|$ and to output at least one feedback signal responsive to an optical phase difference between the first and second modulator arms;
   wherein the controller is configured to adjust the bias signal responsive to the at least one feedback signal.

2. The apparatus of claim 1, wherein the optical modulator circuit is configured to form an IQ modulator wherein the first modulator arm incudes a first Mach-Zehnder modulator (MZM), the second modulator arm incudes a second MZM, the first and second MZMs including the first and second bias electrodes respectively, and wherein the optical modulator circuit further includes a third bias electrode coupled to one of the first and second modulator arms outside of the first and second MZMs.

3. The apparatus of claim 1 wherein the controller includes memory storing slope information that is indicative of a direction of change of the at least one feedback signal, or an error signal obtain therefrom, relative to a change in the bias signal, and wherein the controller is further configured to read the slope information from the memory and to adjust the bias signal in a direction determined using the slope information.

4. The apparatus of claim 1 wherein the controller is configured to generate a reference signal at the difference frequency $f_{12}=|f_1-f_2|$ and to provide the reference signal to the phase-sensitive detector for sampling the PD signal therewith.

5. The apparatus of claim 4 wherein the phase-sensitive detector comprises a lock-in detector.

6. The apparatus of claim 5 wherein the lock-in detector is configured to output a first lock-in signal Us and a second lock-in signal Uc, said lock-in signals representing quadrature components of a dither oscillation at the difference frequency in the PD signal, and wherein the controller is configured to obtain a bias error signal based on the first and second lock-in signal Us, Uc.

7. The apparatus of claim 6 wherein the controller is configured to generate a sine waveform at the difference frequency and a cosine waveform at the difference frequency and to provide said waveforms to the lock-in detector for sampling the PD signal therewith to obtain the first and second lock-in signal Us, Uc.

8. The apparatus of claim 1 wherein neither of the first and second dither frequencies $f_1$, $f_2$ is a harmonic of the other of the first and second dither frequencies.

9. The apparatus of claim 6 wherein the controller comprises logic configured to compute, based on the first and second lock-in signals obtained from the lock-in detector, a phase-corrected lock-in signal corresponding to a pre-determined detection phase of the reference signal relative to the dither oscillation.

10. The apparatus of claim 1 wherein the optical modulator circuit is configured to form an IQ modulator wherein the first modulator arm incudes a first Mach-Zehnder modulator (MZM), the second modulator arm incudes a second MZM, and wherein the first and second bias electrodes are disposed outside of the first and second MZMs.

* * * * *